(12) United States Patent
Sazai et al.

(10) Patent No.: US 11,917,296 B2
(45) Date of Patent: Feb. 27, 2024

(54) WIRING MEMBER, SHAKE CORRECTION UNIT, AND SMARTPHONE

(71) Applicant: Nidec Corporation, Kyoto (JP)

(72) Inventors: Kazuhiro Sazai, Kyoto (JP); Shinri Ono, Kyoto (JP); Keisuke Oshima, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/749,646

(22) Filed: May 20, 2022

(65) Prior Publication Data

US 2022/0385821 A1 Dec. 1, 2022

(30) Foreign Application Priority Data

May 25, 2021 (JP) .................................. 2021-087889
Oct. 29, 2021 (JP) .................................. 2021-178218

(51) Int. Cl.
*H04N 23/68* (2023.01)
*H04M 1/02* (2006.01)
*H04N 23/51* (2023.01)

(52) U.S. Cl.
CPC ........ *H04N 23/687* (2023.01); *H04M 1/0264* (2013.01); *H04M 1/0277* (2013.01); *H04N 23/51* (2023.01); *H04M 2250/52* (2013.01)

(58) Field of Classification Search
CPC ............. H04M 1/0264; H04M 1/0277; H04M 2250/52; H04N 23/51; H04N 23/54; H04N 23/57; H04N 23/687
See application file for complete search history.

(56) References Cited

U.S. PATENT DOCUMENTS

| 2009/0126976 A1* | 5/2009 | Iida .................. | H05K 1/028 |
| | | | 29/829 |
| 2011/0205378 A1* | 8/2011 | Kobayashi ........... | H04N 23/687 |
| | | | 348/208.11 |
| 2018/0284476 A1 | 10/2018 | Minamisawa | |
| 2020/0012068 A1* | 1/2020 | Lim ..................... | H05K 1/181 |
| 2020/0393641 A1* | 12/2020 | Hu ....................... | G03B 13/36 |

(Continued)

FOREIGN PATENT DOCUMENTS

| CN | 108693655 A | 10/2018 |
| CN | 111665677 A | 9/2020 |

(Continued)

OTHER PUBLICATIONS

Official Communication issued in corresponding Chinese Patent Application No. 202210577123.6, dated Apr. 26, 2023.

*Primary Examiner* — Amy R Hsu
(74) *Attorney, Agent, or Firm* — Keating & Bennett, LLP

(57) ABSTRACT

A circuit board is mounted on a camera module with a shake correction function. The circuit board includes a first reference portion extending from a first side in a first direction to a second side in the first direction, a first coupled portion extending from the second side in the first direction to the first side in the first direction, a first direction first bent portion connected to each of an end portion on the second side in the first direction of the first reference portion and an end portion on the second side in the first direction of the first coupled portion, and a second direction extending first portion extending in a second direction orthogonal to the first direction from the first coupled portion.

20 Claims, 20 Drawing Sheets

(56) References Cited

U.S. PATENT DOCUMENTS

| 2021/0176399 A1* | 6/2021 | Byon ................... H04N 23/685 |
| 2021/0223661 A1 | 7/2021 | Minamisawa et al. |
| 2022/0091477 A1 | 3/2022 | Minamisawa |

FOREIGN PATENT DOCUMENTS

| CN | 111683454 A | 9/2020 |
| CN | 212936006 U | 4/2021 |
| JP | 2007-093953 A | 4/2007 |
| JP | 2009-010259 A | 1/2009 |
| JP | 2020-086367 A | 6/2020 |

* cited by examiner

WIRING MEMBER, SHAKE CORRECTION UNIT, AND SMARTPHONE

CROSS-REFERENCE TO RELATED APPLICATIONS

The present application claims priority under 35 U.S.C. § 119 to Japanese Patent Application No. 2021-087889, filed on May 25, 2021, and to Japanese Patent Application No. 2021-178218, filed on Oct. 29, 2021, the entire contents of which are incorporated herein by reference.

1. Field of the Invention

The present disclosure relates to a circuit board, a shake correction assembly, and a smartphone.

2. Background

Image blur sometimes occurs due to camera shake during capturing of a still image or moving image with a camera. An image stabilization device has been put into practical use to enable clear imaging by preventing such image blur. When a camera shakes, the image stabilization device can remove image blur by correcting the position and orientation of a camera module according to the shake.

An imaging signal of the image stabilization device is output to the outside via a flexible printed circuit (FPC). Since the flexible printed circuit is movable according to the movement of an imaging element, when the resistance of the flexible printed circuit is large, the operation may be hindered. For this reason, it has been studied to appropriately adjust the resistance of the flexible printed circuit. A conventional circuit board structure has three reference planes orthogonal to each other, so that elastic constants on multiple axes are averaged.

However, in the conventional circuit board structure, elastic resistance may be relatively large. In particular, elastic resistance during rotation of a circuit board tends to be relatively large with respect to a rotation axis parallel to a thickness direction of the circuit board. In such a case where the rotational resistance is relatively large, relatively high electric power is required for driving, or an imaging element cannot be appropriately moved with respect to shake and a camera shake cannot be sufficiently corrected in some cases.

SUMMARY

A circuit board according to an example embodiment of the present disclosure is mounted on a camera module with a shake correction function. The circuit board includes a first reference portion extending from a first side in a first direction to a second side in the first direction, a first coupled portion extending from the second side in the first direction to the first side in the first direction, a first direction first bent portion connected to each of an end portion on the second side in the first direction of the first reference portion and an end portion on the second side in the first direction of the first coupled portion, and a second direction extending first portion extending in a second direction orthogonal to the first direction from the first coupled portion.

A shake correction assembly according to an example embodiment of the present disclosure corrects a shake of an optical module including at least an imaging element. The shake correction assembly includes a movable body, a fixed body that movably supports the movable body, and the circuit board described above connected to the movable body.

A smartphone according to an example embodiment of the present disclosure includes an optical assembly including the shake correction assembly described above and the optical module.

The above and other elements, features, steps, characteristics and advantages of the present disclosure will become more apparent from the following detailed description of the example embodiments with reference to the attached drawings.

DETAILED DESCRIPTION

Figure 1:
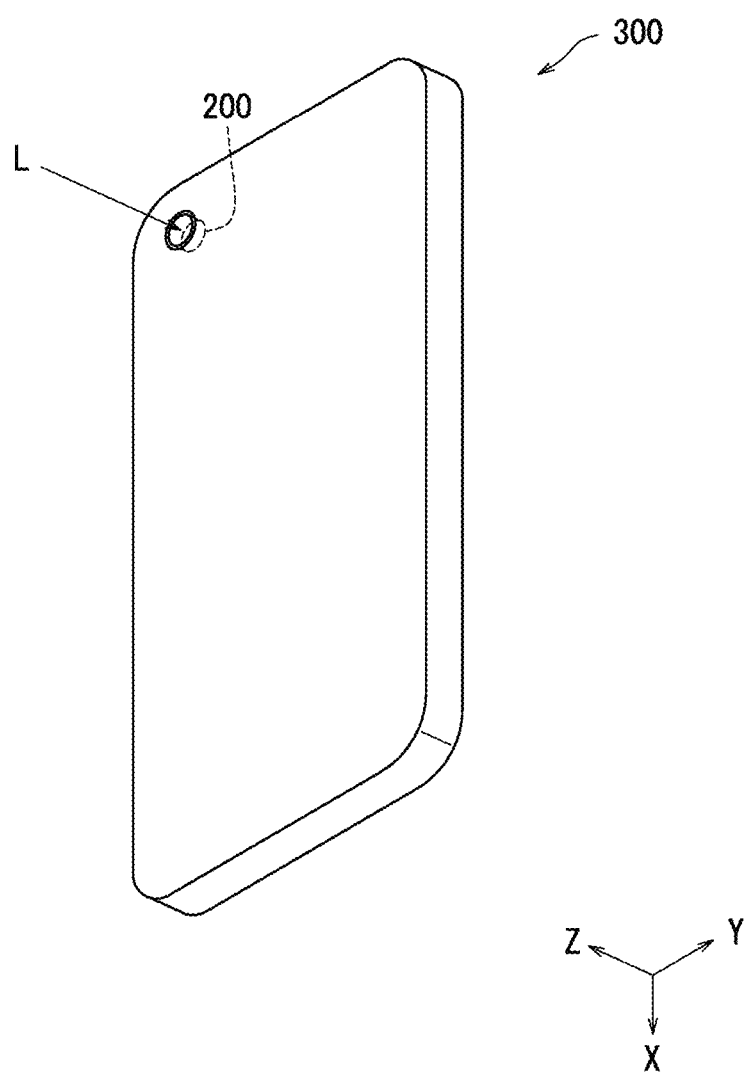
FIG. 1 is a schematic perspective view of a smartphone including an optical assembly of the present example embodiment.

Hereinafter, example embodiments of circuit boards, shake correction assemblies, optical assemblies, and smartphones according to the present disclosure will be described with reference to the drawings. Note that in the drawings, the same or corresponding elements or features will be denoted by the same reference symbols and description of such elements or features will not be repeated. Note that in the description of the present application, an X-axis, a Y-axis, and a Z-axis that are orthogonal to one another may be used to facilitate understanding of the present disclosure. Here, it should be noted that the X-axis, the Y-axis, and the Z-axis do not limit the orientation of the optical assembly during use. Further, in the description of the present application, the Z-axis direction may be described as a first direction, the Y-axis direction may be described as a second direction, and the X-axis direction may be described as a third direction. It should be noted that the relationships between the X-axis, Y-axis, and Z-axis directions and the first to third directions are not limited to the above.

An optical assembly of the present example embodiment is suitably used as an optical component of a smartphone.

First, a smartphone 300 including an optical assembly 200 of the present example embodiment will be described with reference to FIG. 1. FIG. 1 is a schematic perspective view of the smartphone 300 including the optical assembly 200 of the present example embodiment.

As illustrated in FIG. 1, the smartphone 300 of the present example embodiment includes the optical assembly 200. The optical assembly 200 is incorporated in the smartphone 300 as an example. Light L enters the smartphone 300 from the outside through the optical assembly 200, and a subject image is captured on the basis of the light that enters the optical assembly 200. The optical assembly 200 is used to correct blur of the captured image when the smartphone 300 shakes. Note that the optical assembly 200 may include an imaging element, and the optical assembly 200 may include an optical member that transmits light to the imaging element. Since the smartphone 300 includes the optical assembly 200, shake in the smartphone 300 can be corrected.

The optical assembly 200 is preferably manufactured in a small size. In this manner, the smartphone 300 itself can be downsized, or another component can be incorporated in the smartphone 300 without upsizing the smartphone 300.

Note that the application of the optical assembly 200 is not limited to the smartphone 300, and the optical assembly 200 can be used in various devices such as cameras and videos without particular limitation. For example, the optical assembly 200 may be incorporated in, for example, an imaging device such as a mobile phone with a camera or a drive recorder, or an action camera and a wearable camera incorporated in a moving body such as a helmet, a bicycle, or a radio-controlled helicopter.

Figure 2A:
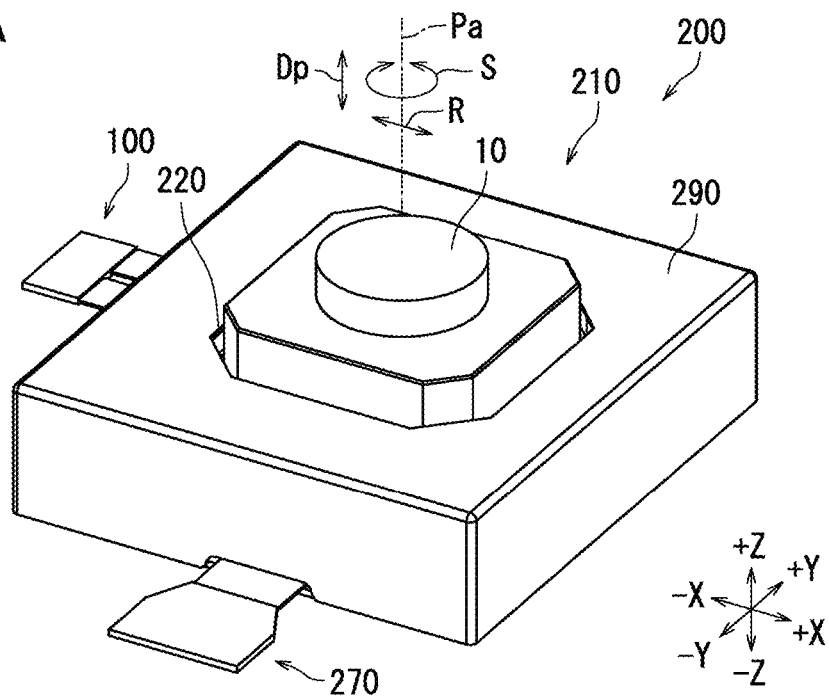
FIG. 2A is a schematic perspective view of the optical assembly of the present example embodiment.
Figure 2B:
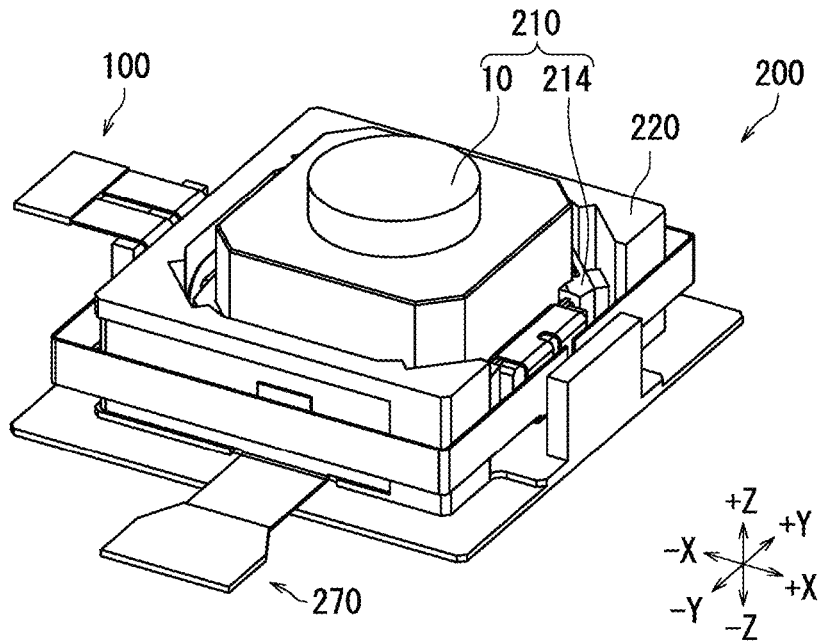
FIG. 2B is a schematic perspective view of the optical assembly of the present example embodiment.

Next, the optical assembly 200 according to the present example embodiment will be described with reference to FIGS. 1 to 2B. FIGS. 2A and 2B are schematic perspective views of the optical assembly 200 of the present example embodiment. In FIG. 2B, a housing case 290 is omitted.

As illustrated in FIGS. 2A and 2B, the optical assembly 200 includes a movable body 210, a fixed body 220, a circuit board 270, and a housing case 290. The movable body 210 includes an optical element 10 having at least an imaging element and a holder 214. The movable body 210 is arranged so as to be movable with respect to the fixed body 220. Here, the fixed body 220 is covered with the housing case 290. The optical element 10 includes a circuit board 100. A part of the circuit board 100 and the circuit board 270 extends from the inside to the outside of the fixed body 220 and the housing case 290. The circuit board 100 extends in the −X direction with respect to the fixed body 220 and the housing case 290. The circuit board 270 extends in the −Y direction with respect to the fixed body 220 and the housing case 290.

The optical element 10 has an optical axis Pa. The optical axis Pa extends in the Z direction from the center of a surface on the +Z direction side of the optical element 10. Light along the optical axis Pa enters the optical element 10. A light incident surface of the optical element 10 is arranged on a surface on the +Z direction side of the optical element 10. The optical axis Pa extends in the normal direction with respect to the light incident surface. The optical axis Pa extends in an optical axis direction Dp. The optical axis direction Dp is parallel to the normal line of the light incident surface of the optical element 10.

The direction orthogonal to the optical axis direction Dp is a direction intersecting the optical axis Pa and perpendicular to the optical axis Pa. In the present description, a direction orthogonal to the optical axis Pa may be referred to as a "radial direction". Of the radial directions, radially outward indicates a direction away from the optical axis Pa. In FIG. 2A, a reference sign R indicates an example of the radial direction. Further, a direction of rotation about the optical axis Pa may be referred to as a "circumferential direction". In FIG. 2A, a reference sign S indicates the circumferential direction.

When the movable body 210 is inserted into the fixed body 220 and the movable body 210 is mounted on the fixed body 220, the optical axis Pa of the optical element 10 becomes parallel to the Z-axis direction. When the movable body 210 moves with respect to the fixed body 220 from this state, the optical axis Pa of the optical element 10 swings, and the optical axis Pa is no longer parallel to the Z-axis direction.

Hereinafter, it is assumed that the movable body 210 is not moved with respect to the fixed body 220 and the state in which the optical axis Pa is parallel to the Z-axis direction is maintained. That is, in the description of the shape, positional relationship, movement, and the like of the movable body 210, the fixed body 220, and the like with reference to the optical axis Pa, it is assumed that the optical axis Pa is parallel to the Z-axis direction unless the inclination of the optical axis Pa is specifically described.

The movable body 210 is rotatable about at least a first rotation axis extending in the first direction (for example, the Z direction). The movable body 210 is accommodated in the fixed body 220. Note that in a case where the movable body 210 is accommodated in the fixed body 220, the entire movable body 210 does not need to be located inside the fixed body 220, and a part of the movable body 210 may be exposed or protrude from the fixed body 220.

The fixed body 220 surrounds the movable body 210. The movable body 210 is inserted into the fixed body 220 and held by the fixed body 220. The circuit board 100 may be mounted on an outer surface of the fixed body 220. The circuit board 100 or the circuit board 270 includes, for example, a flexible printed circuit (FPC). Typically, the circuit board 270 transmits a signal for swinging the movable body 210. The circuit board 100 transmits a signal obtained in the optical element 10.

The movable body 210 includes the optical element 10 and the holder 214. The optical element 10 is accommodated in the holder 214. The holder 214 holds the optical element 10.

The circuit board 100 surrounds the periphery of the fixed body 220 in a manner separated from the fixed body 220. For this reason, the circuit board 100 is located radially outside the fixed body 220 in a manner separated from the fixed body 220. In this manner, the circuit board 100 can be prevented from coming into contact with the fixed body 220.

Figure 3:
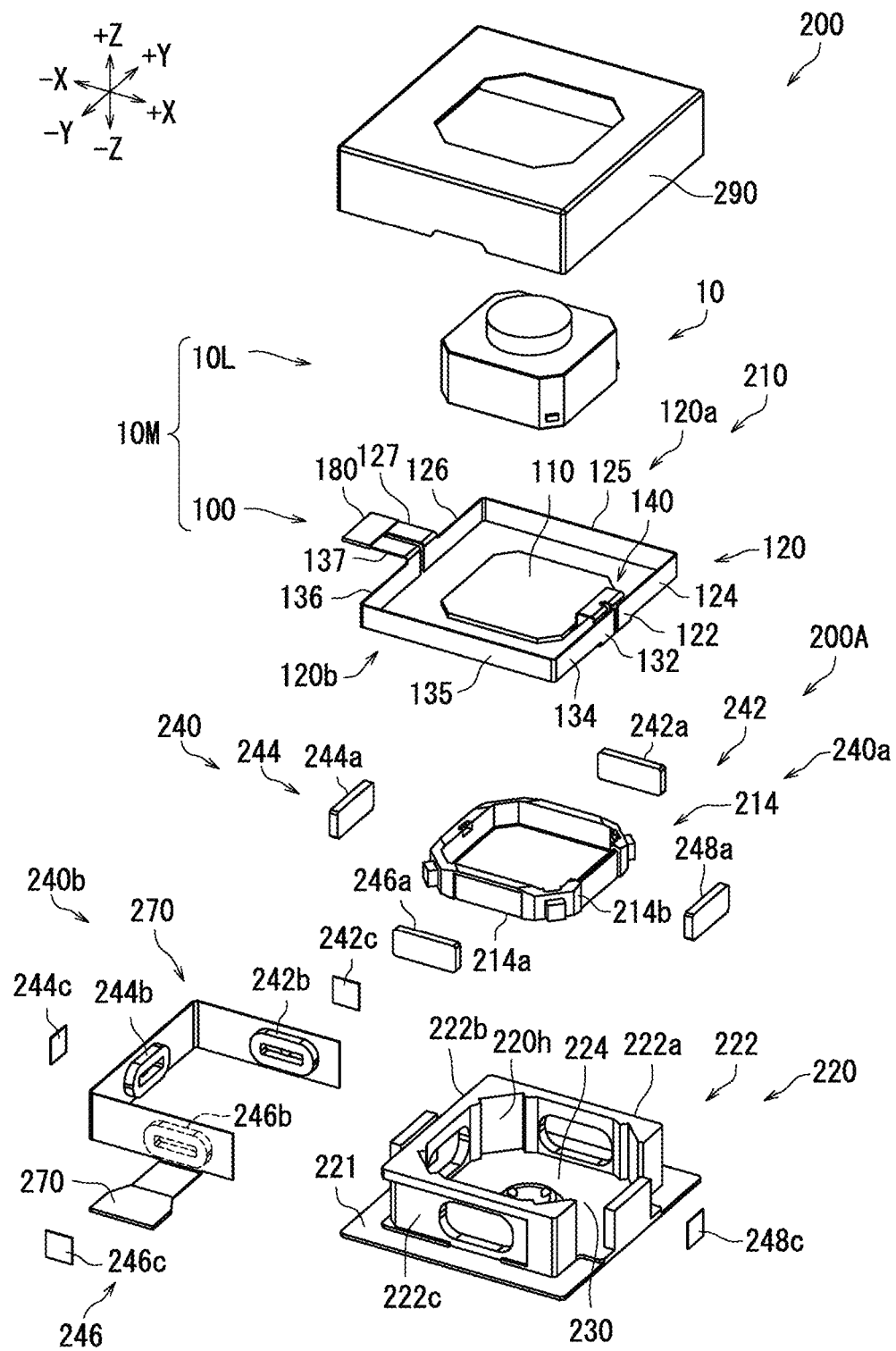
FIG. 3 is a schematic exploded perspective view of the optical assembly of the present example embodiment.

Next, the optical assembly 200 according to the present example embodiment will be described with reference to FIGS. 1 to 3. FIG. 3 is a schematic exploded perspective view of the optical assembly 200 of the present example embodiment.

As illustrated in FIG. 3, the optical assembly 200 includes the movable body 210, the fixed body 220, a support mechanism 230, a swing mechanism 240, the circuit board 270, and the housing case 290.

The movable body 210 includes the optical element 10 and the holder 214. The optical element 10 is accommodated in the holder 214. The holder 214 holds the optical element 10.

The optical element 10 includes an optical module 10M having at least an imaging element. The optical module 10M is also referred to as a camera module. The optical module 10M includes a lens unit 10L and the circuit board 100.

The support mechanism 230 supports the movable body 210 with respect to the fixed body 220. The swing mechanism 240 swings the movable body 210 with respect to the fixed body 220.

Note that, in the present description, the optical assembly 200 includes a shake correction assembly 200A. The shake correction assembly 200A includes the holder 214, the fixed body 220, the support mechanism 230, the swing mechanism 240, the circuit board 270, and the housing case 290. The shake correction assembly 200A may or may not include the optical element 10. The circuit board 100 may be mounted on a camera module with a shake correction function.

Here, the movable body 210 has a thin substantially rectangular parallelepiped shape. When viewed along the Z-axis, the movable body 210 has a rotationally symmetric structure. The length of the movable body 210 along the X-axis direction is substantially equal to the length of the movable body 210 along the Y-axis direction. Further, the length of the movable body 210 along the Z-axis direction is smaller than the length of the movable body 210 along the X-axis direction or the Y-axis direction.

The movable body 210 includes the optical element 10 and the holder 214. The optical element 10 has a substantially rectangular parallelepiped shape partially including a projecting portion. The holder 214 holds the optical element 10. The holder 214 has a substantially hollow rectangular parallelepiped shape in which a part of a surface on a first side is opened.

The holder 214 has a bottom portion 214a and a side portion 214b. The side portion 214b protrudes in the +Z direction from an outer edge of the bottom portion 214a. The bottom portion 214a faces the fixed body 220.

Here, at least a part of a bottom surface of the optical element 10 is in contact with at least a part of the bottom portion 214a of the holder 214. For this reason, the optical element 10 is supported by the bottom portion 214a of the holder 214. The holder 214 has a symmetrical structure with respect to the optical axis Pa when viewed from the Z direction.

The optical element 10 includes the optical module 10M. The optical module 10M includes the lens unit 10L and the circuit board 100. An imaging element is built in the lens unit 10L. The circuit board 100 has a plurality of wirings. The plurality of wirings are insulated from each other. The circuit board 100 transmits a signal generated in the imaging element. Further, the circuit board 100 transmits a signal for driving the imaging element. A part of the circuit board 100 is arranged between the lens unit 10L and the holder 214.

As described above, the optical element 10 includes the optical module 10M. The optical module 10M includes the lens unit 10L and the circuit board 100 electrically connected to the imaging element in the lens unit 10L. The circuit board 100 faces an upper surface of the bottom portion 214a of the holder 214.

The circuit board 100 includes a flat portion 110, a peripheral portion 120, an extended portion 140, and an external terminal connection portion 180. The flat portion 110 and the peripheral portion 120 are electrically connected. An external terminal is connected to the external terminal connection portion 180. The circuit board 100 can output an imaging signal acquired by the optical element 10 to the external terminal.

The flat portion 110 has a thin plate shape extending in an XY plane. The lens unit 10L is arranged on the +Z direction side of the flat portion 110. The flat portion 110 is sandwiched between the lens unit 10L and the holder 214.

The extended portion 140 is located on the +X direction side with respect to the flat portion 110. The extended portion 140 connects the flat portion 110 and the peripheral portion 120.

The peripheral portion 120 connects the extended portion 140 and the external terminal connection portion 180. The peripheral portion 120 surrounds the flat portion 110. The peripheral portion 120 linearly surrounds the periphery of the flat portion 110. The peripheral portion 120 branches to surround the flat portion 110. In the present description, the flat portion 110 may be referred to as a first circuit board 110, and the peripheral portion 120 may be referred to as a second circuit board 120.

The peripheral portion 120 includes a first wiring portion 120a and a second wiring portion 120b. The first wiring portion 120a is located on the +Y direction side with respect to the flat portion 110. The second wiring portion 120b is located on the −Y direction side with respect to the flat portion 110.

For example, the first wiring portion 120a includes one linear circuit board. The first wiring portion 120a includes a first reference portion 121 (FIG. 4), a first coupled portion 122, a first direction first bent portion 123, a second direction extending first portion 124, a third direction extending first portion 125, a second direction extending third portion 126, and a third direction extending third portion 127. The first reference portion 121, the first coupled portion 122, the first direction first bent portion 123, and the second direction extending first portion 124 are located on the +X direction side with respect to the flat portion 110.

Similarly, the second wiring portion 120b includes one linear circuit board. The second wiring portion 120b includes a second reference portion 131 (FIG. 4), a second coupled portion 132, a first direction second bent portion 133 (FIG. 4), a second direction extending second portion 134, a third direction extending second portion 135, a second direction extending fourth portion 136, and a third direction extending fourth portion 137. The second reference portion 131, the second coupled portion 132, the first direction second bent portion 133, and the second direction extending second portion 134 are located on the +X direction side with respect to the flat portion 110. Each of the first wiring portion 120a and the second wiring portion 120b has a plurality of wirings insulated from each other. In the present description, the first wiring portion 120a and the second wiring portion 120b may be referred to as a first wiring board and a second wiring board, respectively.

An external terminal is connected to the external terminal connection portion 180. A signal from the imaging element and power to the imaging element can be input and output by the external terminal. The external terminal connection portion 180 is located on the −X direction side of the flat portion 110. The external terminal connection portion 180 is connected to an end portion of the first wiring portion 120a. Further, the external terminal connection portion 180 is connected to an end portion of the second wiring portion 120b. Note that, in the present example embodiment, an end portion of the first wiring portion 120a and an end portion of the second wiring portion 120b are connected to one external terminal connection portion 180. However, the present disclosure is not limited to this configuration. There may be a plurality of the external terminal connection portions 180. For example, one end portion of the first wiring portion 120a and one end portion of the second wiring portion 120b may be connected to two of the external terminal connection portions 180. For example, one third direction extending first portion 125 of the first wiring portion 120a and one third direction extending second portion 135 of the second wiring portion 120b may be connected to two of the external terminal connection portions 180.

The fixed body 220 has an opening portion 220h. The movable body 210 is placed inside the fixed body 220. Typically, the movable body 210 is mounted from the outside of the fixed body 220 to the inside of the fixed body 220.

The fixed body 220 has a bottom portion 221 and a side portion 222. The bottom portion 221 extends in the XY plane. The bottom portion 221 has a thin plate shape. The side portion 222 protrudes from the bottom portion 221 in the +Z direction.

The side portion 222 includes a first side portion 222a, a second side portion 222b, and a third side portion 222c. When the movable body 210 is mounted on the fixed body 220, the first side portion 222a, the second side portion 222b, and the third side portion 222c are located around the movable body 210. The second side portion 222b is connected to the first side portion 222a, and the third side portion 222c is connected to the second side portion 222b.

The first side portion 222a is located in the +Y direction with respect to the movable body 210. A through hole is provided in the first side portion 222a. The second side portion 222b is located in the −X direction with respect to the movable body 210. A through hole is provided in the second side portion 222b. The third side portion 222c is located in the −Y direction with respect to the movable body 210. A through hole is provided in the third side portion 222c.

As described above, in a case where the movable body 210 is mounted on the fixed body 220, three sides of the movable body 210 are surrounded by the first side portion 222a, the second side portion 222b, and the third side portion 222c. In contrast, no side portion is provided on the +X direction side of the movable body 210. However, a side portion may be provided on the +X direction side of the movable body 210.

The support mechanism 230 supports the movable body 210. The support mechanism 230 is arranged on the fixed body 220. Typically, the support mechanism 230 is arranged on the bottom portion 221 of the fixed body 220. Here, the support mechanism 230 supports the movable body 210 from the same circumference.

For example, the support mechanism 230 may be bonded to the fixed body 220 by an adhesive. Alternatively, the support mechanism 230 may be resin-molded integrally with the fixed body 220. That is, the support mechanism 230 and the fixed body 220 may be a single member. When the support mechanism 230 is arranged on the fixed body 220, the support mechanism 230 protrudes from the fixed body 220 toward the movable body 210. For this reason, even when the movable body 210 swings with respect to the fixed body 220, it is possible to prevent the movable body 210 from colliding with the fixed body 220.

The support mechanism 230 supports the movable body 210 with respect to the fixed body 220. The swing mechanism 240 swings the movable body 210 with respect to the fixed body 220.

The swing mechanism 240 swings the movable body 210 with respect to the fixed body 220. By the swing mechanism 240, the movable body 210 swings with respect to the fixed body 220. At this time, a rotation center of the movable body 210 is on the optical axis Pa.

The swing mechanism 240 swings the movable body 210 with respect to the fixed body 220. The swing mechanism 240 can swing the movable body 210 with respect to the fixed body 220 with reference to the rotation center.

In an optical device including the optical element 10, when the optical device is inclined at the time of imaging, the optical element 10 is inclined, and the captured image is disturbed. In order to avoid disturbance of the captured image, the optical assembly 200 corrects the inclination of the optical element 10 on the basis of the acceleration, the angular velocity, the shake amount, and the like detected by detection means such as a gyroscope. In the present example embodiment, the optical assembly 200 corrects the inclination of the optical element 10 by swinging (rotating) the movable body 210 in a rotation direction (yawing direction) with the X-axis as the rotation axis, a rotation direction (pitching direction) with the Y-axis as the rotation axis, and a rotation direction (rolling direction) with the Z-axis as the rotation axis.

For example, correction of pitching, yawing, and rolling of the movable body 210 is performed as described below. When shake in at least one of the pitching direction, the yawing direction, and the rolling direction occurs in the optical assembly 200, the shake is detected by a magnetic sensor (Hall element) (not illustrated), and based on a result of the detection, the swing mechanism 240 is driven to swing the movable body 210. Note that the shake of the optical assembly 200 may be detected using a shake detection sensor (gyroscope) or the like. Current is supplied to the swing mechanism 240 based on a detection result of the shake to correct the shake.

Note that a swing mechanism other than the swing mechanism 240 may swing the movable body 210 with respect to the fixed body 220. The X-axis direction is a direction orthogonal to the optical axis direction Dp in which the optical axis Pa of the optical element 10 extends, and is an axis of rotation in the yawing direction. The Y-axis direction is a direction orthogonal to the optical axis direction Dp in which the optical axis Pa of the optical element 10 extends, and is an axis of rotation in the pitching direction. The Z-axis direction is parallel to the optical axis direction Dp and is an axis of rotation in the rolling direction.

As described above, the optical assembly 200 of the present example embodiment includes the movable body 210, the fixed body 220, the support mechanism 230, and the swing mechanism 240. The movable body 210 is arranged so as to be movable with respect to the fixed body 220. The support mechanism 230 supports the movable body 210. The swing mechanism 240 swings the movable body 210 with respect to the fixed body 220. The movable body 210 includes the optical element 10 and the holder 214. The optical element 10 has an optical axis Pa. The holder 214 holds the optical element 10.

The holder 214 has a bottom portion 214a and a side portion 214b. The support mechanism 230 supports the bottom portion 214a of the holder 214.

The swing mechanism 240 swings the movable body 210 with respect to the fixed body 220. The swing mechanism 240 includes a first swing mechanism 242, a second swing mechanism 244, and a third swing mechanism 246. The first swing mechanism 242, the second swing mechanism 244, and the third swing mechanism 246 swing the movable body 210 around different axes with respect to the fixed body 220.

The first swing mechanism 242 swings the movable body 210 with respect to the fixed body 220. The first swing mechanism 242 swings the movable body 210 around the X-axis in a state where the rotation center of the movable body 210 is fixed in the XZ plane. Here, the X-axis direction is an axis of rotation in the yawing direction. The first swing mechanism 242 is located on the +Y direction side of the movable body 210.

The first swing mechanism 242 includes a magnet 242a and a coil 242b. The magnet 242a is magnetized such that a magnetic pole of a surface facing radially outward is different on either side of a magnetization polarization line extending along the X-axis direction. An end portion on a first side along the Z-axis direction of the magnet 242a has a first polarity, and an end portion on a second side has a second polarity.

The magnet 242a is arranged on the +Y direction side of the side portion 214b of the holder 214. The coil 242b is arranged on the circuit board 270. The coil 242b is located in a through hole penetrating the first side portion 222a of the fixed body 220.

By controlling the direction and the magnitude of the current flowing through the coil 242b, the direction and the magnitude of a magnetic field generated from the coil 242b can be changed. Hence, the first swing mechanism 242 swings the movable body 210 around the X-axis by the interaction between the magnetic field generated from the coil 242b and the magnet 242a.

The second swing mechanism 244 swings the movable body 210 with respect to the fixed body 220. The second swing mechanism 244 swings the movable body 210 around the Y-axis in a state where the rotation center of the movable body 210 is fixed in a YZ plane. Here, the Y-axis direction is an axis of rotation in the pitching direction. The second swing mechanism 244 is located on the −X direction side of the movable body 210.

The second swing mechanism 244 includes a magnet 244a and a coil 244b. The magnet 244a is magnetized such that the magnetic pole of a surface facing radially outward is different on either side of a magnetization polarization line extending along the Y-axis direction. An end portion on a first side along the Z-axis direction of the magnet 244a has a first polarity, and an end portion on a second side has a second polarity.

The magnet 244a is arranged on the −X direction side of the side portion 214b of the holder 214. The coil 244b is arranged on the circuit board 270. The coil 244b is located in a through hole penetrating the second side portion 222b of the fixed body 220.

By controlling the direction and the magnitude of the current flowing through the coil 244b, the direction and the magnitude of a magnetic field generated from the coil 244b can be changed. Hence, the second swing mechanism 244 swings the movable body 210 around the Y-axis by the interaction between the magnetic field generated from the coil 244b and the magnet 244a.

The third swing mechanism 246 swings the movable body 210 with respect to the fixed body 220. Specifically, the third swing mechanism 246 swings the movable body 210 around the Z-axis in a state where the rotation center of the movable body 210 is fixed in the XZ plane. Here, the Z-axis direction is parallel to the optical axis Pa and is an axis of rotation in the rolling direction. The third swing mechanism 246 is located on the −Y direction side of the movable body 210.

The third swing mechanism 246 includes a magnet 246a and a coil 246b. The magnet 246a is magnetized such that the magnetic pole of a surface facing radially outward is different on either side of a magnetization polarization line extending along the Z-axis direction. An end portion on a first side along the X-axis direction of the magnet 246a has a first polarity, and an end portion on a second side has a second polarity.

The magnet 246a is arranged on the −Y direction side of the side portion 214b of the holder 214. The coil 246b is arranged on the circuit board 270. The coil 246b is located in a through hole penetrating the third side portion 222c of the fixed body 220.

By controlling the direction and the magnitude of the current flowing through the coil 246b, the direction and the magnitude of a magnetic field generated from the coil 246b can be changed. Hence, the third swing mechanism 246 swings the movable body 210 around the Z-axis by the interaction between the magnetic field generated from the coil 246b and the magnet 246a.

Note that, in the present description, the magnet 242a, the magnet 244a, and the magnet 246a may be collectively referred to as the magnet 240a. Further, in the present description, the coil 242b, the coil 244b, and the coil 246b may be collectively referred to as the coil 240b.

The swing mechanism 240 includes the magnet 240a provided on the movable body 210 and the coil 240b provided on the fixed body 220. Here, the magnet 240a is arranged on the movable body 210, and the coil 240b is arranged on the fixed body 220. However, the magnet 240a may be arranged on the fixed body 220, and the coil 240b may be arranged on the movable body 210. As described above, a first one of the magnet 240a and the coil 240b may be arranged on a first one of the movable body 210 and the fixed body 220, and a second one of the magnet 240a and the coil 240b may be arranged on a second one of the movable body 210 and the fixed body 220. By controlling the direction and the magnitude of the current flowing through the coil 240b, the direction and the magnitude of a magnetic field generated from the coil 240b can be changed. For this reason, the swing mechanism 240 can swing the movable body 210 by the interaction between the magnetic field generated from the coil 240b and the magnet 240a.

The optical assembly 200 further includes a magnetic body 242c, a magnetic body 244c, and a magnetic body 246c. The magnetic body 242c, the magnetic body 244c, and the magnetic body 246c are arranged on the circuit board 270. The magnetic body 242c is arranged facing the coil 242b on the circuit board 270. The magnetic body 244c is arranged facing the coil 244b on the circuit board 270. The magnetic body 246c is arranged facing the coil 246b on the circuit board 270. The magnetic body 242c, the magnetic body 244c, and the magnetic body 246c may be hard magnetic bodies.

The optical assembly 200 further includes a magnet 248a and a magnetic body 248c. The magnet 248a is arranged on the +X direction side of the side portion 214b of the holder 214. The magnetic body 248c is arranged on the +X direction side of the fixed body 220. The magnet 248a and the magnetic body 248c face each other. The magnetic body 248c may be a hard magnetic body.

The shake correction assembly 200A corrects a shake of the optical element 10 having at least an imaging element. The shake correction assembly 200A includes the movable body 210, the fixed body 220 that movably supports the movable body 210, and the circuit board 100 connected to the movable body 210. The circuit board 100 can be used for the shake correction assembly 200A.

The fixed body 220 has a bottom portion 221 and a side portion 222. A portion of the side portion 222 of the fixed body 220 corresponding to the first coupled portion 122 is opened. In this manner, the circuit board 100 can be prevented from coming into contact with the fixed body 220.

The shake correction assembly 200A further includes the housing case 290 that accommodates the circuit board 100. The housing case 290 can suppress the exposure of the circuit board 100. Further, by accommodating the circuit board 100 in the housing case 290, easy attachment to a smartphone or the like can be achieved.

The shake correction assembly 200A further includes the swing mechanism 240 capable of swinging the movable body 210 with respect to the fixed body 220. The movable body 210 can be swung by the swing mechanism 240.

The swing mechanism 240 includes the first swing mechanism 242 and the second swing mechanism 244. The first swing mechanism 242 swings the movable body 210 with respect to the fixed body 220 about the third direction (X direction) orthogonal to the first direction (Z direction) and the second direction (Y direction) as the axial center. The second swing mechanism 244 swings the movable body 210 with respect to the fixed body 220 about the second direction (Y direction) as the axial center. For this reason, the circuit board 100 can swing about two axes.

The swing mechanism 240 further includes the third swing mechanism 246 that swings the movable body 210 with respect to the fixed body 220 about the first direction (Z direction) as the axial center. In this manner, the circuit board 100 can swing about three axes.

Figure 4A:
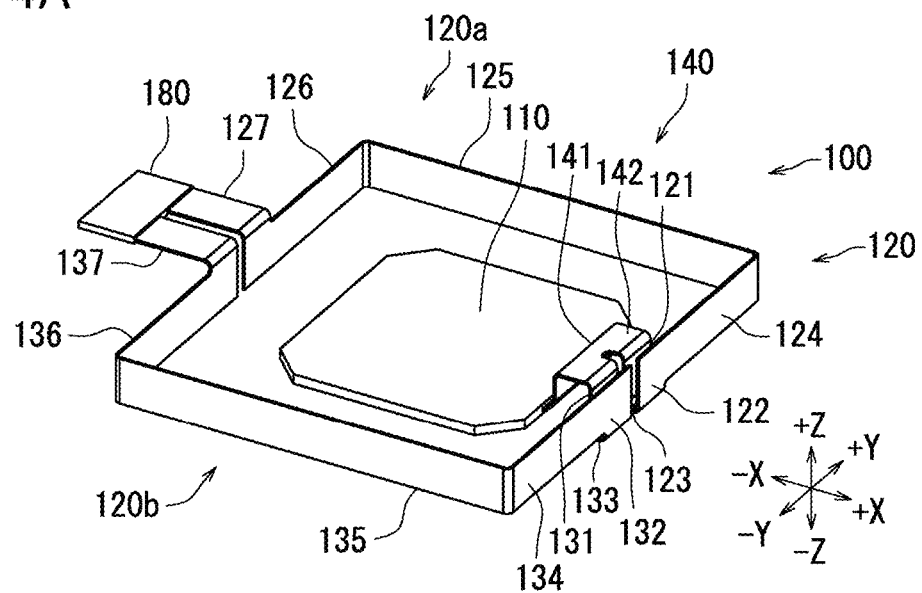
FIG. 4A is a schematic perspective view of a circuit board according to the present example embodiment.
Figure 4B:
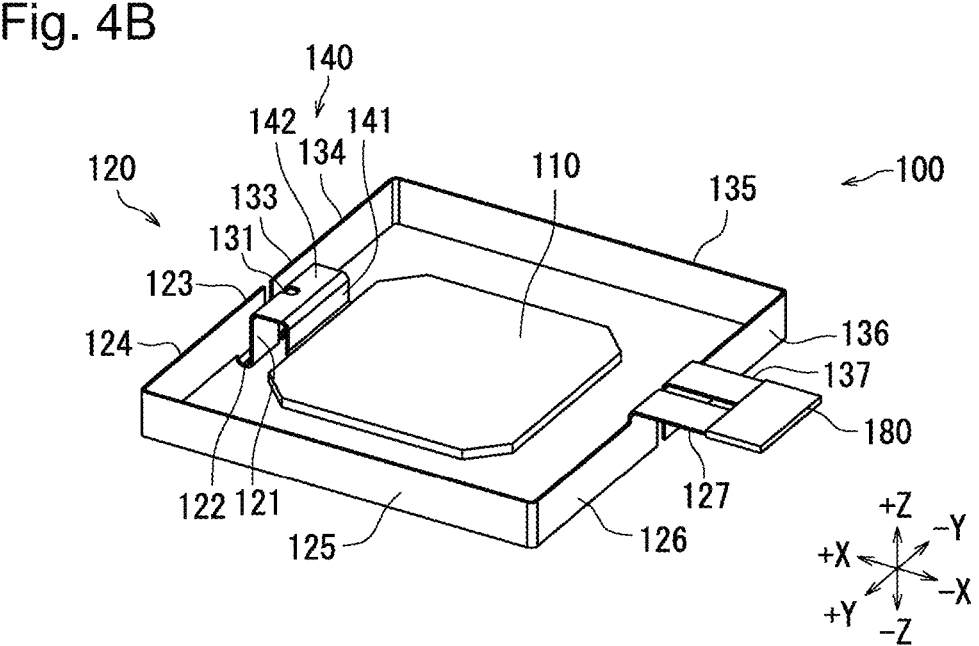
FIG. 4B is a schematic perspective view of the circuit board according to the present example embodiment.
Figure 5:
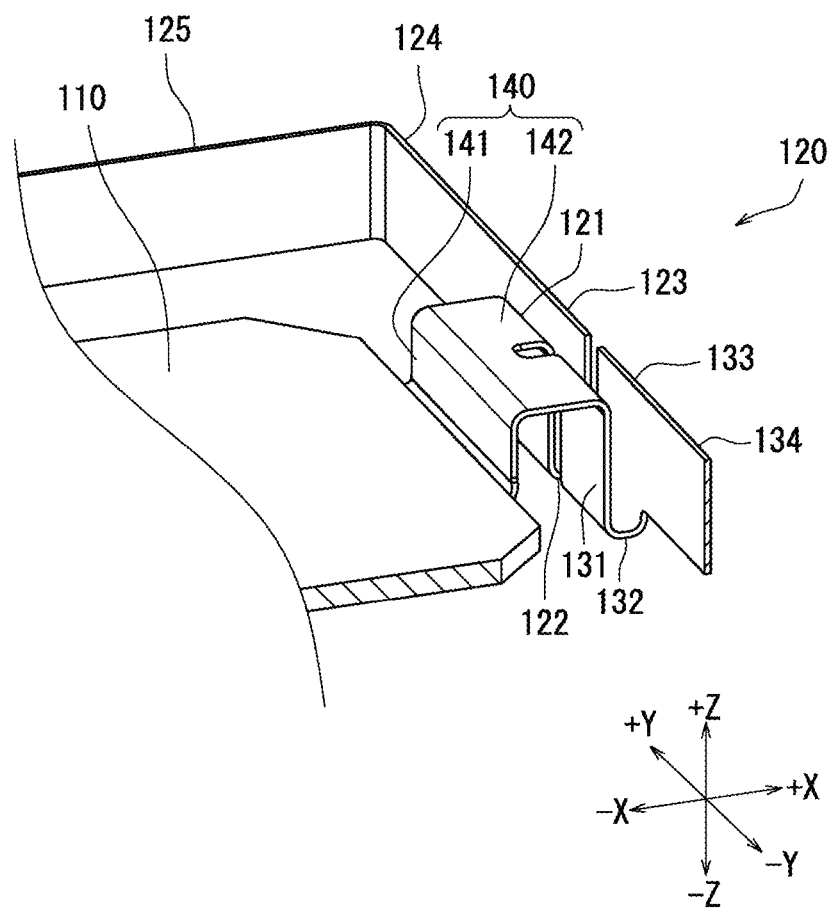
FIG. 5 is a partially enlarged perspective view of the circuit board of the present example embodiment.

Next, the circuit board 100 of the present example embodiment will be described with reference to FIGS. 1 to 5. FIGS. 4A and 4B are schematic perspective views of the circuit board 100 according to the present example embodiment. FIG. 5 is a schematic partially enlarged view of the circuit board 100 according to the present example embodiment.

As illustrated in FIGS. 4A to 5, the circuit board 100 includes the flat portion 110, the peripheral portion 120, the extended portion 140, and the external terminal connection portion 180. The flat portion 110 is a thin plate having a substantially rectangular shape. The peripheral portion 120 surrounds the periphery of the flat portion 110. The extended portion 140 connects the flat portion 110 and the peripheral portion 120. The external terminal connection portion 180 connects the peripheral portion 120 and the external terminal.

The peripheral portion 120 includes a first wiring portion 120a and a second wiring portion 120b. The first wiring portion 120a is located on the +Y direction side with respect to the flat portion 110. The second wiring portion 120b is located on the −Y direction side with respect to the flat portion 110.

Typically, the first wiring portion 120a includes one linear circuit board. The first wiring portion 120a includes the first reference portion 121, the first coupled portion 122, the first direction first bent portion 123, the second direction extending first portion 124, the third direction extending first portion 125, the second direction extending third portion 126, and the third direction extending third portion 127.

The first reference portion 121 extends from the first side (+Z direction) in the first direction to the second side (−Z direction) in the first direction.

The first coupled portion 122 extends from the second side (−Z direction) in the first direction to the first side (+Z direction) in the first direction. For example, the first coupled portion 122 extends in parallel with the first reference portion 121 while facing the first reference portion 121. However, the first coupled portion 122 does not need to face the first reference portion 121, and the first reference portion 121 and the first coupled portion 122 do not need to be arranged in parallel.

The first direction first bent portion 123 is bent in the first direction (Z direction). The first direction first bent portion 123 is connected to each of an end portion of the first reference portion 121 on the second side (−Z direction) in the first direction and an end portion of the first coupled portion 122 on the second side (−Z direction) in the first direction.

The second direction extending first portion 124 extends from the first coupled portion 122 in the second direction (Y direction) orthogonal to the first direction (Z direction). Specifically, the second direction extending first portion 124 extends in the +Y direction from the first coupled portion 122.

The third direction extending first portion 125 extends from the second direction extending first portion 124 in the third direction (X direction) orthogonal to the first direction (Z direction) and the second direction (Y direction). The second direction extending third portion 126 extends in the second direction (Y direction) from the third direction extending first portion 125. The third direction extending third portion 127 extends in the third direction (X direction) from the second direction extending third portion 126 to the external terminal connection portion 180.

Similarly, the second wiring portion 120b includes one linear circuit board. The second wiring portion 120b includes the second reference portion 131, the second coupled portion 132, the first direction second bent portion 133, the second direction extending second portion 134, the third direction extending second portion 135, the second direction extending fourth portion 136, and the third direction extending fourth portion 137.

The second reference portion 131 extends in parallel with the first reference portion 121 from the first side (+Z direction) in the first direction to the second side (−Z direction) in the first direction, separately from the first reference portion 121. The second coupled portion 132 extends from the second side (−Z direction) in the first direction to the first side (+Z direction) in the first direction separately from the first coupled portion 122. The first direction second bent portion 133 is connected to each of an end portion of the second reference portion 131 on the second side (−Z direction) in the first direction and an end portion of the second coupled portion 132 on the second side (−Z direction) in the first direction, separately from the first direction first bent portion 123. The second direction extending second portion 134 extends in the second direction (Y direction) from the second coupled portion 132. Specifically, the second direction extending second portion 134 extends in the −Y direction from the second coupled portion 132.

The third direction extending second portion 135 extends in the third direction (X direction) from the second direction extending second portion 134. The second direction extending fourth portion 136 extends in the second direction (Y direction) from the third direction extending second portion 135. The third direction extending fourth portion 137 extends in the third direction (X direction) from the second direction extending fourth portion 136 to the external terminal connection portion 180.

The extended portion 140 includes a first extended portion 141 and a second extended portion 142. The first extended portion 141 connects the flat portion 110 and the second extended portion 142. The first extended portion 141 extends in the +Z direction from the −Z direction.

The second extended portion 142 connects the first extended portion 141 and the first reference portion 121 or the second reference portion 131. The second extended portion 142 extends in the +X direction from the −X direction. The second extended portion 142 branches into two while extending from the −X direction to the +X direction. One is connected to the first reference portion 121 and the other is connected to the second reference portion 131.

Note that at least any of the flat portion 110, the peripheral portion 120, the extended portion 140, and the external terminal connection portion 180 of the circuit board 100 may be configured by bending one circuit board. However, the flat portion 110, the peripheral portion 120, the extended portion 140, and the external terminal connection portion 180 of the circuit board 100 may be configured from a single circuit board.

As described above, the circuit board 100 is mounted on a camera module with a shake correction function. The circuit board 100 preferably includes the first reference portion 121 extending from the first side (+Z direction) in the first direction to the second side (−Z direction) in the first direction, the first coupled portion 122 extending from the second side (−Z direction) in the first direction to the first side (+Z direction) in the first direction, the first direction first bent portion 123 connected to each of an end portion on the second side (−Z direction) in the first direction of the first reference portion 121 and an end portion on the second side (−Z direction) in the first direction of the first coupled portion 122, and the second direction extending first portion 124 extending from the first coupled portion 122 in the second direction (Y direction) orthogonal to the first direction (Z direction). In this manner, the elastic resistance (rotation resistance) in a case where the circuit board 100 is rotated with respect to a predetermined rotation axis can be reduced.

The first direction first bent portion 123 preferably has a curved structure. In this manner, rotational resistance of the circuit board 100 can be reduced. For example, the curved structure may have a shape that gently bends. In one example, the curved structure may be U-shaped. Alternatively, the curved structure may have a shape bent at an acute angle. In one example, the curved structure may be V-shaped. Alternatively, the curved structure may have a shape in which an angle between the first direction first bent portion 123 and the first reference portion 121 and an angle between the first direction first bent portion 123 and the first coupled portion 122 are substantially right angles. In one example, the curved structure may be U-shaped with right angles.

The circuit board 100 further includes the third direction extending first portion 125 extending from the second direction extending first portion 124 in the third direction (X direction) orthogonal to the first direction (Z direction) and the second direction (Y direction), and the second direction extending third portion 126 extending from the third direction extending first portion 125 in the second direction (Y direction). In this manner, it is possible to reduce the rotational resistance to rotation about the first direction (Z direction) as the axial center.

The circuit board 100 further includes, separately from the first coupled portion 122, the second coupled portion 132 extending from the second side (−Z direction) in the first direction to the first side (+Z direction) in the first direction, and the second direction extending second portion 134 extending from the second coupled portion 132 in the second direction (Y direction). The second direction extending first portion 124 extends from the first coupled portion 122 to a first side (+Y direction) of the second direction. The second direction extending second portion 134 extends from the second coupled portion 132 to the second side (−Y direction) in the second direction. Since the circuit board 100 extends toward both sides in the second direction (Y direction), it is possible to suppress a bias of rotational resistance with respect to rotation about the third direction (X direction) orthogonal to the first direction (Z direction) and the second direction (Y direction) as the axial center.

The circuit board 100 further includes, separately from the first coupled portion 122, the second coupled portion 132 extending from the second side (−Z direction) in the first direction to the first side (+Z direction) in the first direction, the second direction extending second portion 134 extending from the second coupled portion 132 in the second direction, the third direction extending second portion 135 extending from the second direction extending second portion 134 in the third direction (X direction), the second direction extending fourth portion 136 extending from the third direction extending second portion 135 in the second direction (Y direction). The second direction extending first portion 124 extends from the first coupled portion 122 to a first side (+Y direction) of the second direction. The second direction extending second portion 134 extends from the second coupled portion 132 to the second side (−Y direction) in the second direction.

In this manner, the circuit board 100 can be made relatively long with a relatively small size. Further, the rotational resistance can be reduced with respect to the rotation about the first direction (Z direction) as the axial center.

The circuit board 100 has an axisymmetric structure with respect to an axis extending in the third direction (X direction) when viewed from the first direction. With the above configuration, it is possible to suppress a bias of elastic resistance (rotational resistance) of the circuit board 100 with respect to the rotation about the third direction (X direction) as the axial center.

The circuit board 100 further includes, the second reference portion 131 extending in parallel with the first reference portion 121 from the first side (+Z direction) in the first direction to the second side (−Z direction) in the first direction separately from the first reference portion 121, the first direction second bent portion 133 connected to each of an end portion of the second reference portion 131 on the second side (−Z direction) in the first direction and an end portion of the second coupled portion 132 on the second side (−Z direction) in the first direction separately from the first direction first bent portion 123. With the above configuration, it is possible to suppress a bias of elastic resistance (rotational resistance) of the circuit board 100 with respect to the rotation about the third direction (X direction) as the axial center.

The circuit board 100 further includes the flat portion 110 and the extended portion 140 connecting the first reference portion 121 and the second reference portion 131 to the flat portion 110. The flat portion 110 can be connected to the first reference portion 121 and the second reference portion 131 by the extended portion 140.

The circuit board 100 further includes an external terminal connection portion 180 extending in the third direction (X direction) from the second direction extending third portion 126 and the second direction extending fourth portion 136. With the above configuration, the circuit board 100 can be connected to the external terminal.

The extended portion 140 is located on a first side (−X direction) in the third direction with respect to the second direction extending first portion 124 and the second direction extending second portion 134. The external terminal connection portion 180 is located on the first side (−X direction) in the third direction with respect to the second direction extending third portion 126 and the second direction extending fourth portion 136. With the above configuration, the rotational resistance of the circuit board 100 can be reduced.

The thickness direction of the second direction extending first portion 124, the second direction extending second portion 134, the second direction extending third portion 126, and the second direction extending fourth portion 136 is parallel to the third direction (X direction). The thickness direction of the third direction extending first portion 125 and the third direction extending second portion 135 is parallel to the second direction (Y direction). As described above, by arranging the peripheral portion 120 in the vertical direction, the circuit board 100 can be arranged compactly.

Note that, in the circuit board 100 illustrated in FIGS. 2B to 6, a part of the second extended portion 142 branches into two portions, while the first extended portion 141 does not branch. However, the present example embodiment is not limited to this configuration. Both the first extended portion 141 and the second extended portion 142 may branch into two portions, and the extended portion 140 may be connected to the flat portion 110 at two locations.

Figure 6A:
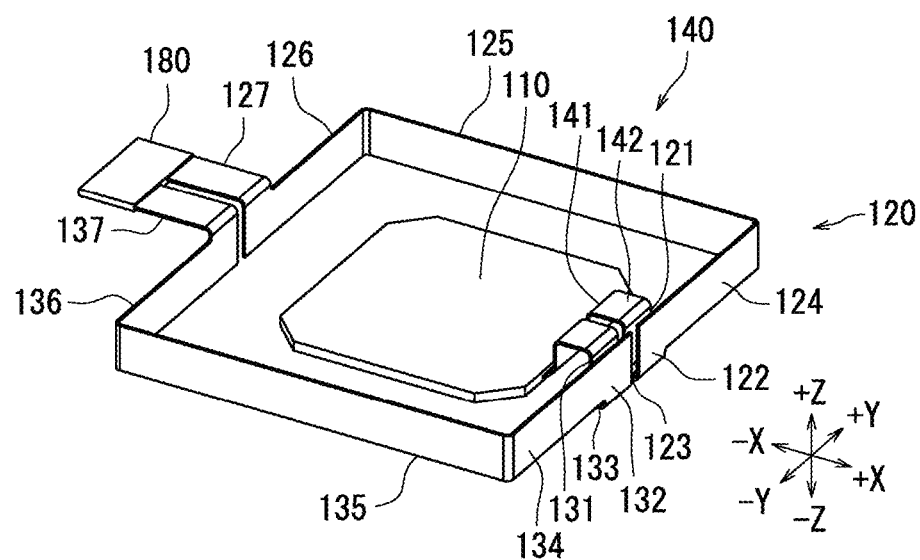
FIG. 6A is a schematic perspective view of the circuit board according to the present example embodiment.

Next, the circuit board 100 of the present example embodiment will be described with reference to FIGS. 1 to 6B. FIG. 6A is a schematic perspective view of the circuit board 100 of the present example embodiment, and FIG. 6B is a developed view of the circuit board 100 of the present example embodiment.

As illustrated in FIG. 6A, both the first extended portion 141 and the second extended portion 142 branch into two portions. One of the first extended portion 141 and the second extended portion 142 is connected to the first reference portion 121, and the other of the first extended portion 141 and the second extended portion 142 is connected to the second reference portion 131.

Figure 6B:
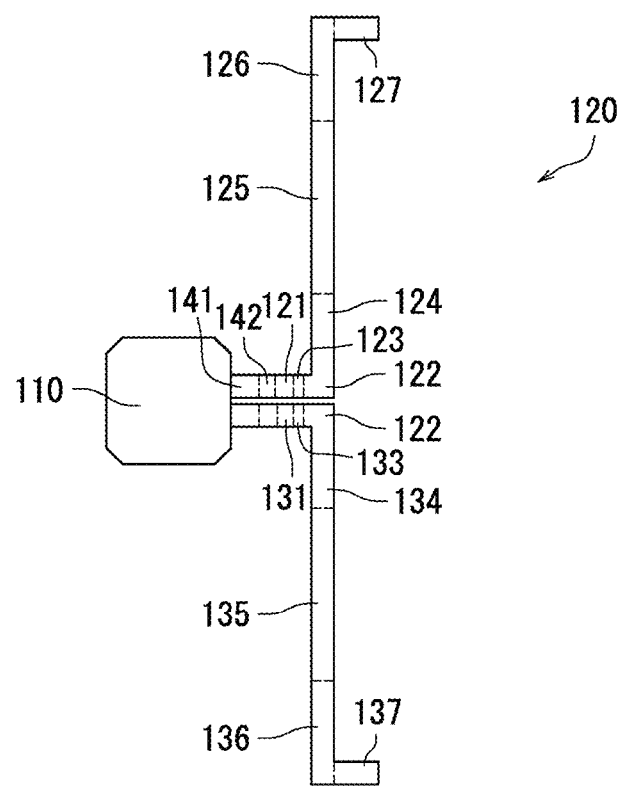
FIG. 6B is a schematic developed view of the circuit board according to the present example embodiment.

As understood from FIGS. 6A and 6B, the first reference portion 121 to the third direction extending third portion 127 can be configured by bending one circuit board extending from the flat portion 110. Similarly, the second reference portion 131 to the third direction extending fourth portion 137 can be configured by bending another circuit board extending from the flat portion 110.

Figure 7:
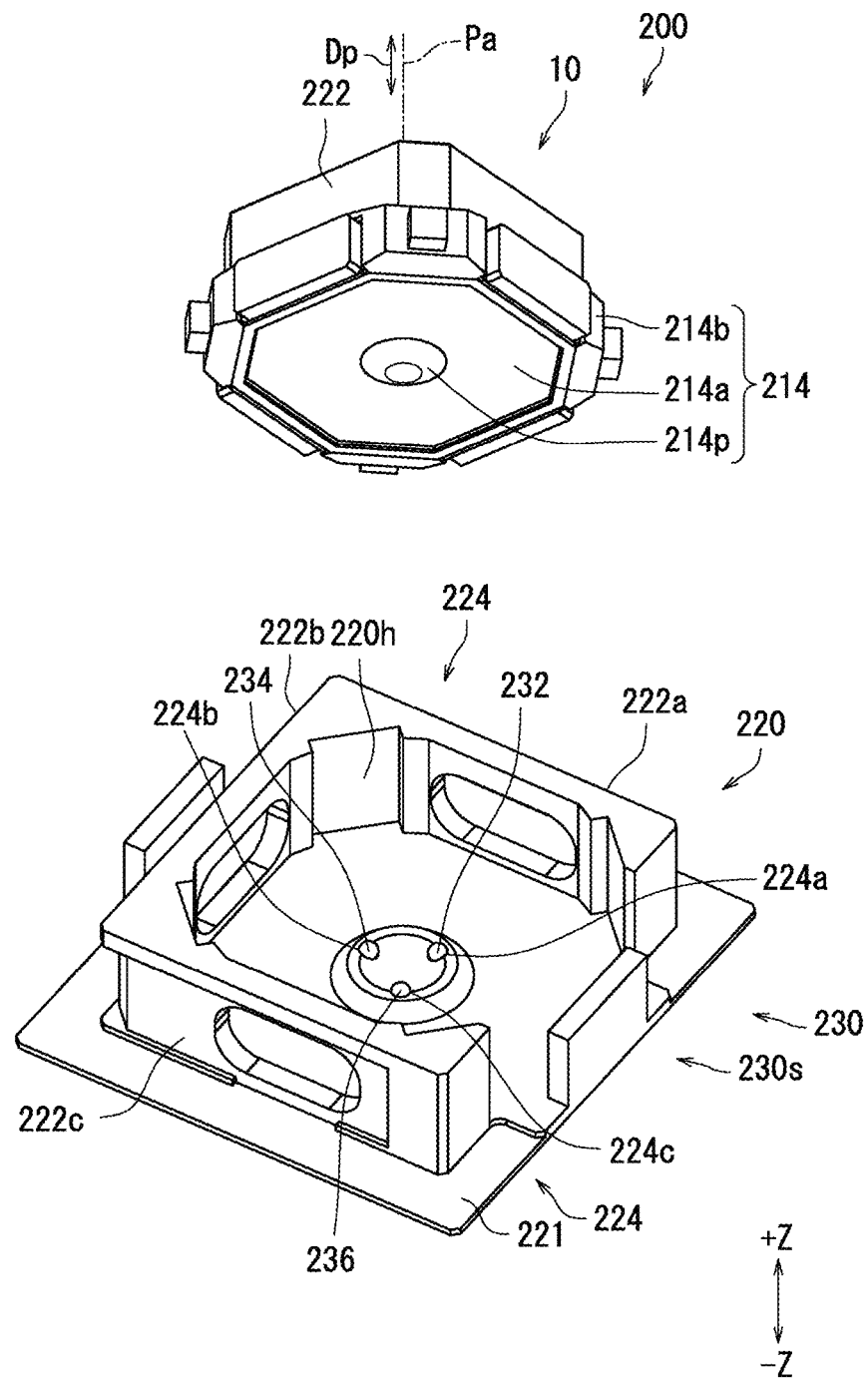
FIG. 7 is a schematic exploded view of a movable body and a fixed body in the optical assembly of the present example embodiment.

Next, the optical assembly 200 according to the present example embodiment will be described with reference to FIGS. 1 to 7. FIG. 7 is a schematic exploded view of the movable body 210 and the fixed body 220 in the optical assembly 200 of the present example embodiment. Note that, in FIG. 7, the circuit board 100 of the movable body 210 is omitted for the purpose of preventing the diagram from being excessively complicated.

As illustrated in FIG. 7, the movable body 210, the optical element 10, and the holder 214 are included. The holder 214 includes the bottom portion 214a, the side portion 214b, and a protrusion 214p. The bottom portion 214a extends in the XY plane. The bottom portion 214a has a substantially rectangular parallelepiped shape. The side portion 214b protrudes in the +Z direction from an outer edge of the bottom portion 214a. The protrusion 214p protrudes from the bottom portion 214a of the holder 214 in the optical axis direction Dp in which the optical axis Pa extends. The protrusion 214p has a hemispherical shape. The protrusion 214p is located at the center of a lower surface of the bottom portion 214a of the holder 214.

The movable body 210 is accommodated in the fixed body 220. The support mechanism 230 is arranged on the fixed body 220. The support mechanism 230 supports the movable body 210. The support mechanism 230 comes into contact with the protrusion 214p of the holder 214 to support the movable body 210.

The fixed body 220 includes the bottom portion 221, the side portion 222, and a recess 224 recessed in the optical axis direction Dp with respect to the bottom portion 221. The support mechanism 230 is arranged on the fixed body 220. The support mechanism 230 is arranged in the recess 224 of the fixed body 220. The recess 224 faces the protrusion 214p of the holder 214.

The recess 224 includes a first recess 224a, a second recess 224b, and a third recess 224c. The first recess 224a, the second recess 224b, and the third recess 224c are arranged at equal intervals on the same circumference around the optical axis Pa. In the present description, the first recess 224a, the second recess 224b, and the third recess 224c may be collectively referred to as the recess 224.

The support mechanism 230 supports the movable body 210. The support mechanism 230 is arranged on the fixed body 220. The support mechanism 230 is located between the recess 224 of the fixed body 220 and the protrusion 214p of the holder 214.

The support mechanism 230 protrudes from the bottom portion 221 of the fixed body 220 toward the protrusion 214p of the holder 214. Even when the movable body 210 swings with respect to the fixed body 220, it is possible to prevent the movable body 210 from colliding with the fixed body 220.

The support mechanism 230 includes a plurality of support portions 230s. The plurality of support portions 230s have the same shape. Here, the support mechanism 230 includes a first support portion 232, a second support portion 234, and a third support portion 236. In the present specification, the first support portion 232, the second support portion 234, and the third support portion 236 may be collectively referred to as the support portion 230s.

The first support portion 232, the second support portion 234, and the third support portion 236 are arranged in the first recess 224a, the second recess 224b, and the third recess 224c, respectively. For this reason, the first support portion 232, the second support portion 234, and the third support portion 236 are arranged at equal intervals on the same circumference around the optical axis Pa. Therefore, the movable body 210 can be stably supported with respect to the fixed body 220.

The first support portion 232, the second support portion 234, and the third support portion 236 have a spherical shape or a shape of a part of a spherical surface. A portion of a spherical surface shape of the first support portion 232, the second support portion 234, and the third support portion 236 comes into contact with the protrusion 214p of the holder 214, so that the movable body 210 can slide with respect to the support mechanism 230.

The bottom portion 214a of the holder 214 has the protrusion 214p protruding in the optical axis direction Dp. The support mechanism 230 includes the plurality of support portions 230s arranged on the same circumference with respect to the optical axis Pa. The plurality of support portions 230s are located radially outside with respect to the protrusion 214p of the holder 214. The optical element 10 can be sufficiently supported by the support portions 230s arranged on the same circumference.

The support portion 230s has a spherical shape or a partial shape of a spherical surface. For this reason, the movable body 210 can be slid by the support portion 230s.

Figure 8A:
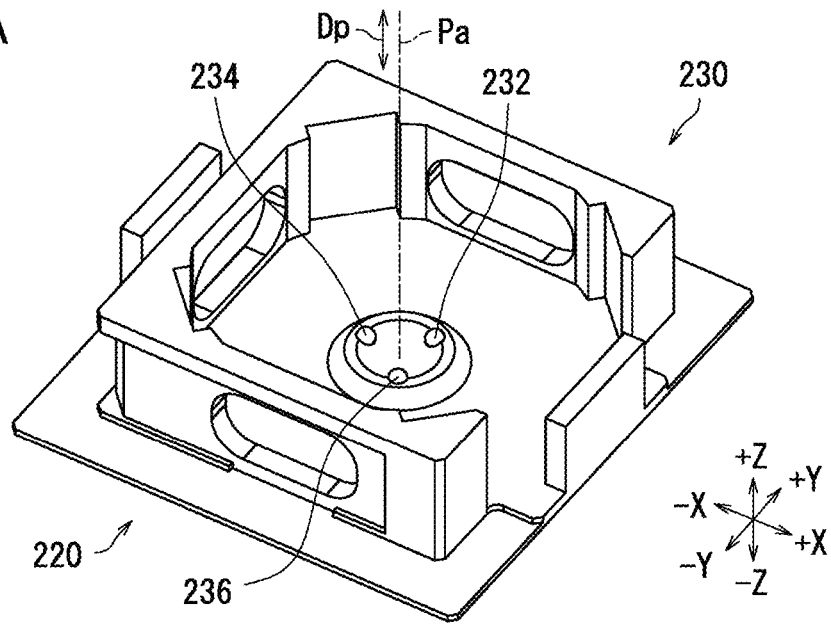
FIG. 8A is a schematic perspective view of the fixed body and a support mechanism in the optical assembly of the present example embodiment.
Figure 8B:
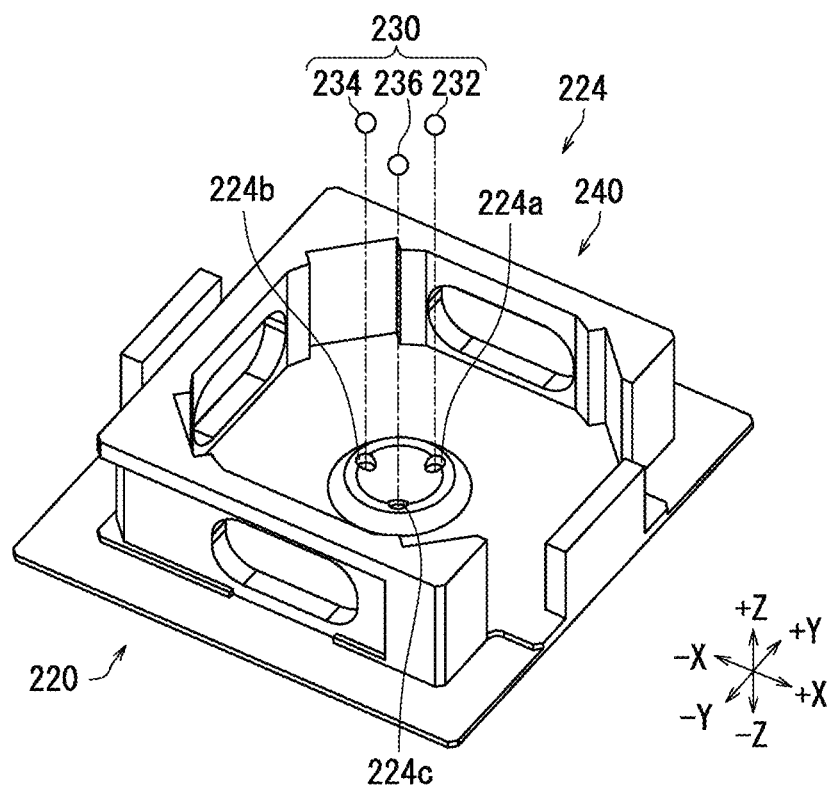
FIG. 8B is a schematic exploded perspective view of the fixed body and the support mechanism in the optical assembly of the present example embodiment.

Next, the optical assembly 200 according to the present example embodiment will be described with reference to FIGS. 1 to 8B. FIG. 8A is a schematic perspective view of the fixed body 220 and the support mechanism 230 in the optical assembly 200 according to the present example embodiment. FIG. 8B is a schematic exploded perspective view of the fixed body 220 and the support mechanism 230 in the optical assembly 200 according to the present example embodiment.

As illustrated in FIG. 8A, the first support portion 232, the second support portion 234, and the third support portion 236 are arranged on the fixed body 220. The first support portion 232, the second support portion 234, and the third support portion 236 are located on the same circumference around the optical axis Pa. The first support portion 232, the second support portion 234, and the third support portion 236 have a spherical shape.

As illustrated in FIG. 8B, the recess 224 is provided on the bottom portion 221 of the fixed body 220. The recess 224 is provided corresponding to the support mechanism 230. Specifically, the recess 224 includes the first recess 224a corresponding to the first support portion 232, the second recess 224b corresponding to the second support portion 234, and the third recess 224c corresponding to the third support portion 236.

Note that, in the above description with reference to FIGS. 2 to 8B, the movable body 210 and the fixed body 220 have a substantially square shape when viewed from the Z direction. However, the present example embodiment is not limited to this configuration. The movable body 210 and the fixed body 220 may have a rectangular shape extending in one direction when viewed from the Z direction.

Further, in the above description with reference to FIGS. 2 to 8B, the circuit board 100 surrounds the movable body 210. However, the present example embodiment is not limited to this configuration. The circuit board 100 does not need to surround the movable body 210.

Figure 9A:
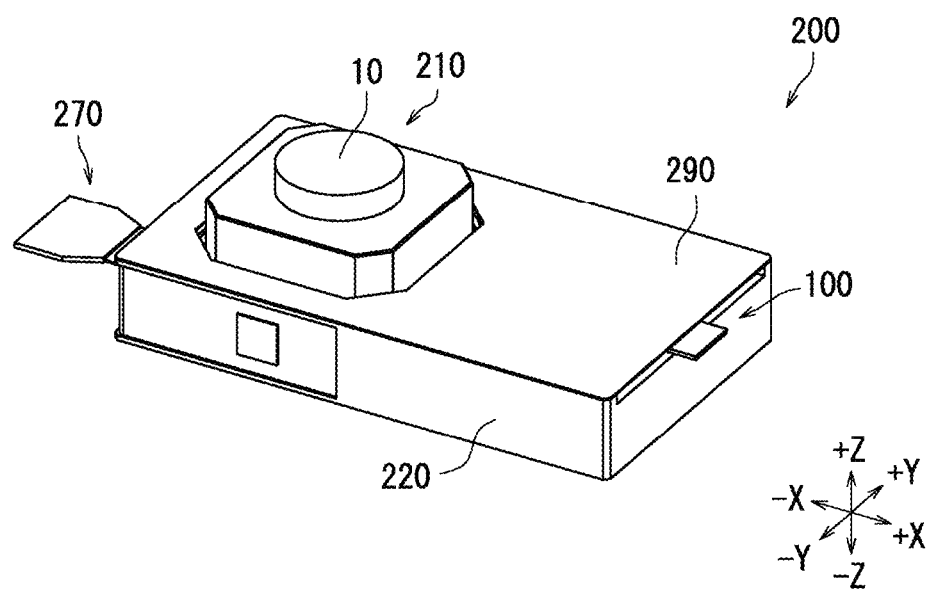
FIG. 9A is a schematic perspective view of the optical assembly of the present example embodiment.
Figure 9B:
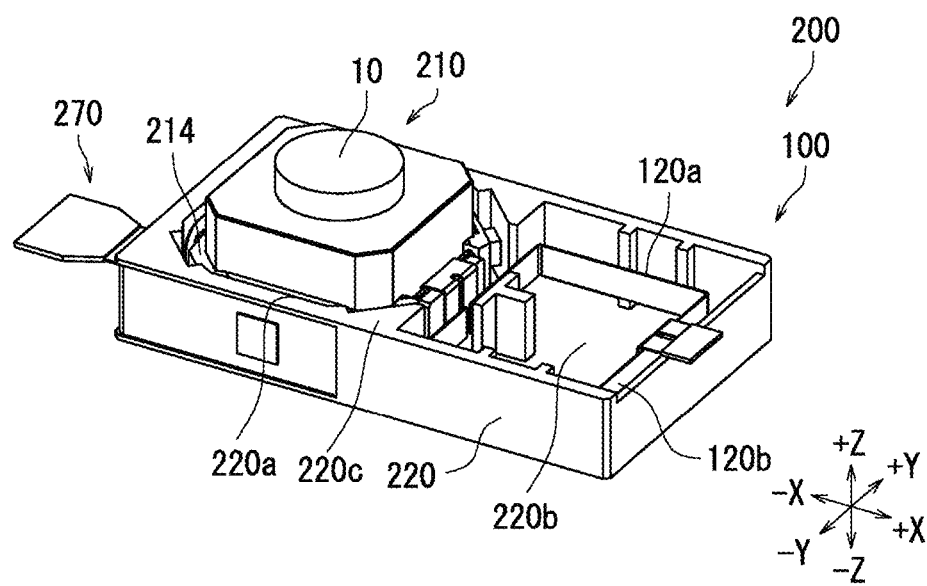
FIG. 9B is a schematic perspective view of the optical assembly of the present example embodiment.

Next, the optical assembly 200 according to the present example embodiment will be described with reference to FIGS. 9A and 9B. FIGS. 9A and 9B are schematic perspective views of the optical assembly 200 of the present example embodiment. Note that, in FIG. 9B, the housing case 290 that covers the fixed body 220 is omitted from illustration for the purpose of preventing the diagram from being excessively complicated.

As illustrated in FIGS. 9A and 9B, the optical assembly 200 includes the movable body 210, the fixed body 220, the support mechanism 230, the swing mechanism 240, and the circuit board 270. Here, the fixed body 220 extends in the X-axis direction. The housing case 290 is located on the +Z direction side with respect to the fixed body 220. The housing case 290 covers an opening portion of the fixed body 220. The circuit board 270 or the circuit board 100 includes, for example, a flexible printed circuit.

The circuit board 100 extends in the X direction. The circuit board 100 extends in the +X direction with respect to the fixed body 220 and the housing case 290.

The circuit board 270 extends in the X direction. The circuit board 270 extends in the −X direction with respect to the fixed body 220 and the housing case 290. The coils 242b, 244b, and 246b (FIG. 3) are attached to the circuit board 270.

The fixed body 220 accommodates the circuit board 100 together with the movable body 210. The fixed body 220 includes a first housing portion 220a, a second housing portion 220b, and a separation wall 220w. The first housing portion 220a accommodates the optical element 10 and the first circuit board 110. The second housing portion 220b is adjacent to the first housing portion 220a. The second housing portion 220b accommodates at least a part of the second circuit board 120.

The separation wall 220w is located between the first housing portion 220a and the second housing portion 220b. A length of an inner diameter of the first housing portion 220a along the Y direction is substantially equal to a length of an inner diameter of the second housing portion 220b along the Y direction. Further, the separation wall 220w protrudes in the −Y direction with respect to the first housing portion 220a and the second housing portion 220b in the +Y direction of the fixed body 220. Further, the separation wall 220w protrudes in the +Y direction with respect to the first housing portion 220a and the second housing portion 220b in the −Y direction of the fixed body 220. As described above, the separation wall 220w separates the first housing portion 220a and the second housing portion 220b.

The circuit board 100 is separated into two. The circuit board 100 includes the first wiring portion 120a and the second wiring portion 120b. The first wiring portion 120a and the second wiring portion 120b may be configured from a single circuit board or may be configured from different circuit boards.

The first wiring portion 120a and the second wiring portion 120b have a symmetrical structure. When viewed from the X direction, the first wiring portion 120a and the second wiring portion 120b are symmetrical.

Next, the circuit board 100 of the present example embodiment will be described with reference to FIGS. 1 to 10. FIG. is a schematic perspective view of the circuit board 100 according to the present example embodiment. Here, the flat portion 110 of the circuit board 100 is omitted.

Figure 10:
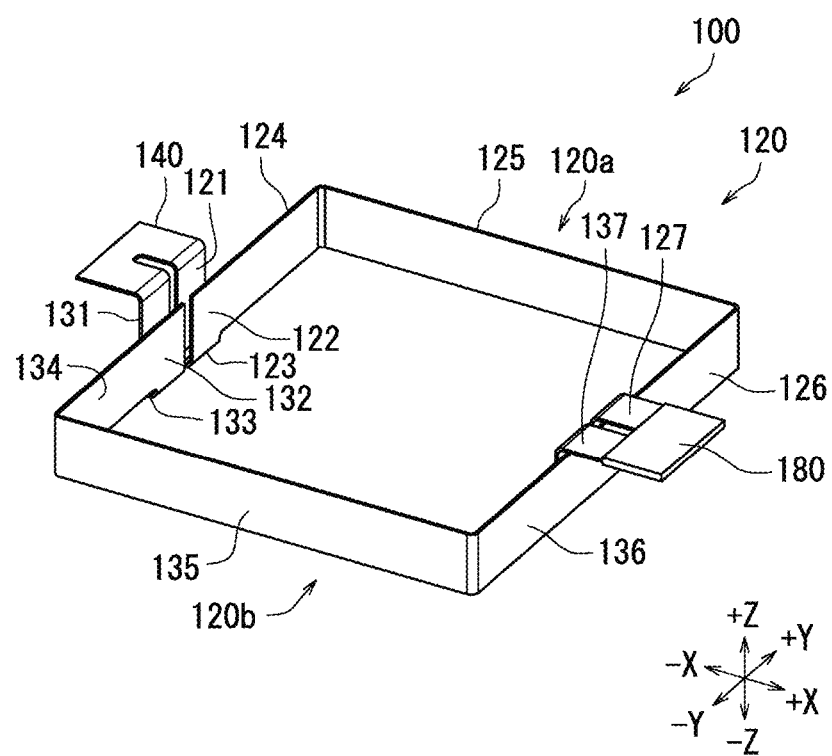
FIG. 10 is a schematic perspective view of the circuit board according to the present example embodiment.

As illustrated in FIG. 10, in the circuit board 100, the peripheral portion 120 includes the first wiring portion 120a and the second wiring portion 120b. The first wiring portion 120a is located on the +Y direction side. The second wiring portion 120b is located on the −Y direction side. The first wiring portion 120a includes the first reference portion 121 to the third direction extending third portion 127. The second wiring portion 120b includes the second reference portion 131 to the third direction extending fourth portion 137.

Here, the extended portion 140 and the external terminal connection portion 180 are located outside the peripheral portion 120. The extended portion 140 is located on the −X direction side with respect to the peripheral portion 120, and the external terminal connection portion 180 is located on the +X direction side with respect to the peripheral portion 120.

Specifically, the extended portion 140 is located on the first side (−X direction) in the third direction with respect to the second direction extending first portion 124 and the second direction extending second portion 134. The external terminal connection portion 180 is located on a second side (+X direction) in the third direction with respect to the second direction extending third portion 126 and the second direction extending fourth portion 136. In this manner, the circuit board 100 can be easily connected to an external terminal.

Note that, in the circuit board 100 illustrated in FIGS. 2 to 10, the first direction first bent portion 123 is connected to −Z direction end portions of the first reference portion 121 and the first coupled portion 122, and the first direction second bent portion 133 is connected to −Z direction end portions of the second reference portion 131 and the second coupled portion 132. However, the present example embodiment is not limited to this configuration.

Figure 11:
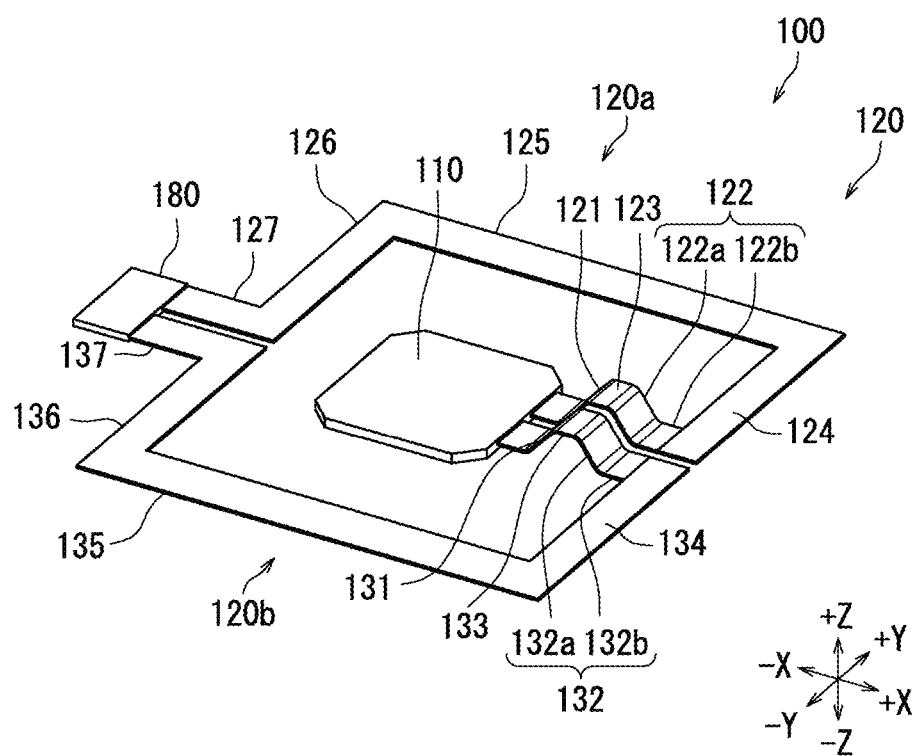
FIG. 11 is a schematic perspective view of the circuit board according to the present example embodiment.

Next, the circuit board 100 of the present example embodiment will be described with reference to FIGS. 1 to 11. FIG. 11 is a schematic perspective view of the circuit board 100 according to the present example embodiment.

As illustrated in FIG. 11, in the circuit board 100, the peripheral portion 120 includes the first wiring portion 120a and the second wiring portion 120b. The first wiring portion 120a is located on the +Y direction side with respect to the flat portion 110. The second wiring portion 120b is located on the −Y direction side with respect to the flat portion 110. The first wiring portion 120a includes the first reference portion 121 to the third direction extending third portion 127. The second wiring portion 120b includes the second reference portion 131 to the third direction extending fourth portion 137.

The first coupled portion 122 has a bent portion 122a that is bent from the first direction first bent portion 123 and a flat portion 122b that is flatly connected to the second direction extending first portion 124. The first direction first bent portion 123 is connected to the +Z direction end portions of the first reference portion 121 and the first coupled portion 122.

The second coupled portion 132 has a bent portion 132a bent from the first direction second bent portion 133, and a flat portion 132b flatly connected to the second direction extending second portion 134. The first direction second bent portion 133 is connected to the +Z direction end portions of the second reference portion 131 and the second coupled portion 132.

Note that, in the circuit board 100 illustrated in FIG. 11, the peripheral portion 120 is arranged in the lateral direction. For this reason, the thickness direction of the second direction extending first portion 124, the third direction extending first portion 125, the second direction extending third portion 126, and the third direction extending third portion 127 is parallel to the first direction (Z direction). Similarly, the thickness direction of the second direction extending second portion 134, the third direction extending second portion 135, the second direction extending fourth portion 136, and the third direction extending fourth portion 137 is parallel to the first direction (Z direction).

Figure 12:
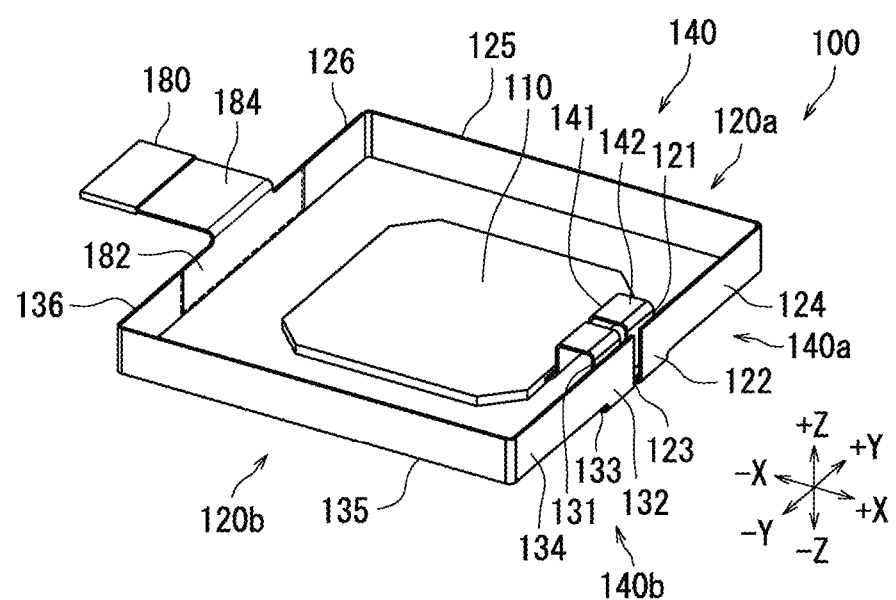
FIG. 12 is a schematic perspective view of the circuit board according to the present example embodiment.

The circuit board 100 may have a configuration as illustrated in FIG. 12. FIG. 12 is a schematic perspective view of the circuit board 100 of the present example embodiment. As illustrated in FIG. 12, the circuit board 100 includes the flat portion 110, the first wiring portion 120a, the second wiring portion 120b, the extended portion 140, and the external terminal connection portion 180. The first wiring portion 120a includes the first reference portion 121, the first coupled portion 122, the first direction first bent portion 123, the second direction extending first portion 124, the third direction extending first portion 125, and the second direction extending third portion 126. The first reference portion 121, the first coupled portion 122, the first direction first bent portion 123, and the second direction extending first portion 124 are located on the +X direction side with respect to the flat portion 110.

Similarly, the second wiring portion 120b includes the second reference portion 131, the second coupled portion 132, the first direction second bent portion 133, the second direction extending second portion 134, the third direction extending second portion 135, and the second direction extending fourth portion 136. The second reference portion 131, the second coupled portion 132, the first direction second bent portion 133, and the second direction extending second portion 134 are located on the +X direction side with respect to the flat portion 110.

The extended portion 140 is separated into a plurality of portions. Here, the extended portion 140 includes a first separated portion 140a and a second separated portion 140b. The first separated portion 140a and the second separated portion 140b are separated from each other. The first separated portion 140a includes the first extended portion 141 and the second extended portion 142. The first extended portion 141 connects the flat portion 110 and the second extended portion 142. The first extended portion 141 extends in the +Z direction from the −Z direction. The second extended portion 142 connects the first extended portion 141 to the first wiring portion 120a and the second wiring portion 120b. Like the first separated portion 140a, the second separated portion 140b includes the first extended portion 141 and the second extended portion 142.

Here, the external terminal connection portion 180 has a wiring connection portion 182 and a wide portion 184. The wiring connection portion 182 is connected to the first wiring portion 120a and the second wiring portion 120b. Specifically, the wiring connection portion 182 is connected to the second direction extending third portion 126 and the second direction extending fourth portion 136. The wide portion 184 is connected to the wiring connection portion 182 and is located on the side opposite to the flat portion 110 with respect to the wiring connection portion 182. The thickness direction of the wiring connection portion 182 is parallel to the X direction, and the thickness direction of the wide portion 184 is parallel to the Z direction.

Figure 13:
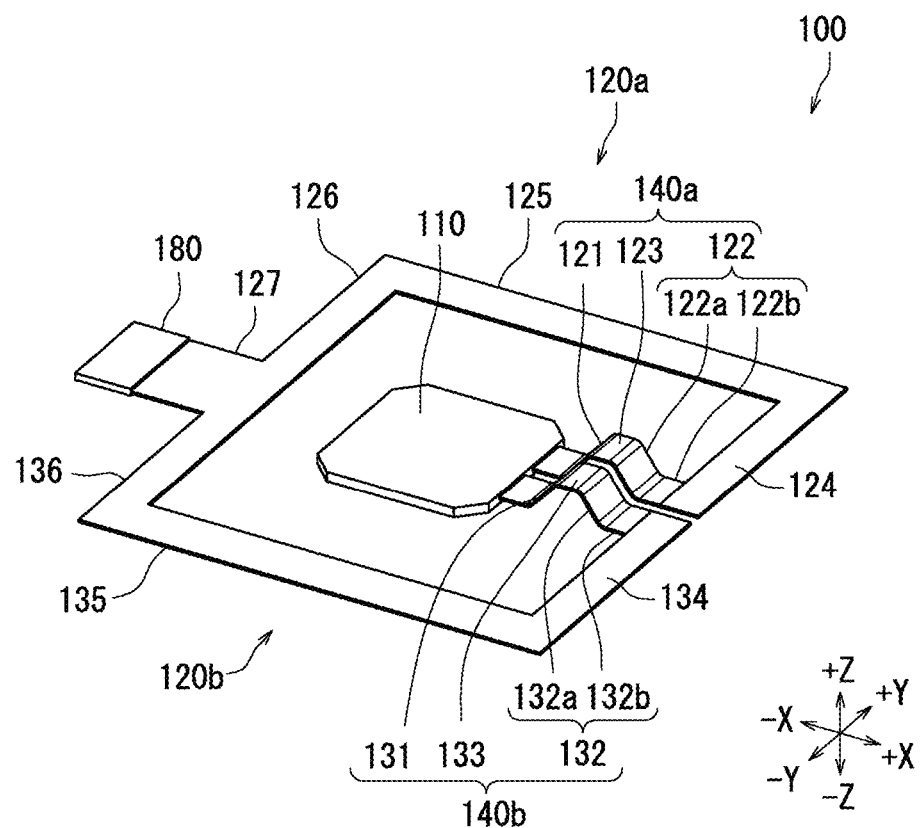
FIG. 13 is a schematic perspective view of the circuit board according to the present example embodiment.

Alternatively, the circuit board 100 may have a configuration as illustrated in FIG. 13. FIG. 13 is a schematic perspective view of the circuit board 100 of the present example embodiment. As illustrated in FIG. 13, the circuit board 100 includes the first wiring portion 120a and the second wiring portion 120b. The first wiring portion 120a is located on the +Y direction side with respect to the flat portion 110. The second wiring portion 120b is located on the −Y direction side with respect to the flat portion 110. The first wiring portion 120a includes the second direction extending first portion 124 to the third direction extending third portion 127. The second wiring portion 120*b* includes the second direction extending second portion 134 to the second direction extending fourth portion 136. The third direction extending third portion 127 is connected not only to the second direction extending third portion 126 but also to the second direction extending fourth portion 136.

The first separated portion 140*a* includes the first reference portion 121, the first coupled portion 122, and the first direction first bent portion 123. The first coupled portion 122 has a bent portion 123*a* that is bent from the first direction first bent portion 123 and the flat portion 122*b* that is flatly connected to the second direction extending first portion 124. The first direction first bent portion 123 is connected to the +Z direction end portions of the first reference portion 121 and the first coupled portion 122.

The second separated portion 140*b* includes the second reference portion 131, the second coupled portion 132, and the first direction second bent portion 133. The second coupled portion 132 has a bent portion 132*a* bent from the first direction second bent portion 133, and a flat portion 132*b* flatly connected to the second direction extending second portion 134. The first direction second bent portion 133 is connected to the +Z direction end portions of the second reference portion 131 and the second coupled portion 132.

Note that, in the circuit board 100 illustrated in FIG. 13, the first wiring portion 120*a* and the second wiring portion 120*b* are arranged in the lateral direction. For this reason, the thickness direction of the second direction extending first portion 124, the third direction extending first portion 125, the second direction extending third portion 126, and the third direction extending third portion 127 is parallel to the first direction (Z direction). Similarly, the thickness direction of the second direction extending second portion 134, the third direction extending second portion 135, and the second direction extending fourth portion 136 is parallel to the first direction (Z direction).

Note that, in the above description with reference to FIGS. 1 to 13, the circuit board 100 includes the first reference portion 121, the first coupled portion 122, and the first direction first bent portion 123, and further includes the second reference portion 131, the second coupled portion 132, and the first direction second bent portion 133. However, the present example embodiment is not limited to this configuration. The circuit board 100 does not need to include the first reference portion 121, the first coupled portion 122, and the first direction first bent portion 123, and does not need to include the second reference portion 131, the second coupled portion 132, and the first direction second bent portion 133.

Figure 14A:
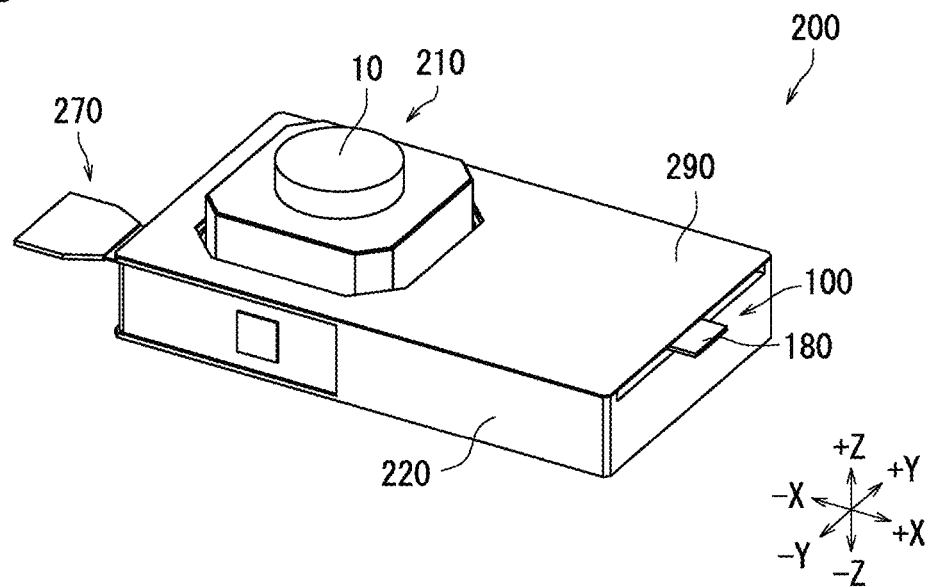
FIG. 14A is a schematic perspective view of the optical assembly of the present example embodiment.
Figure 14B:
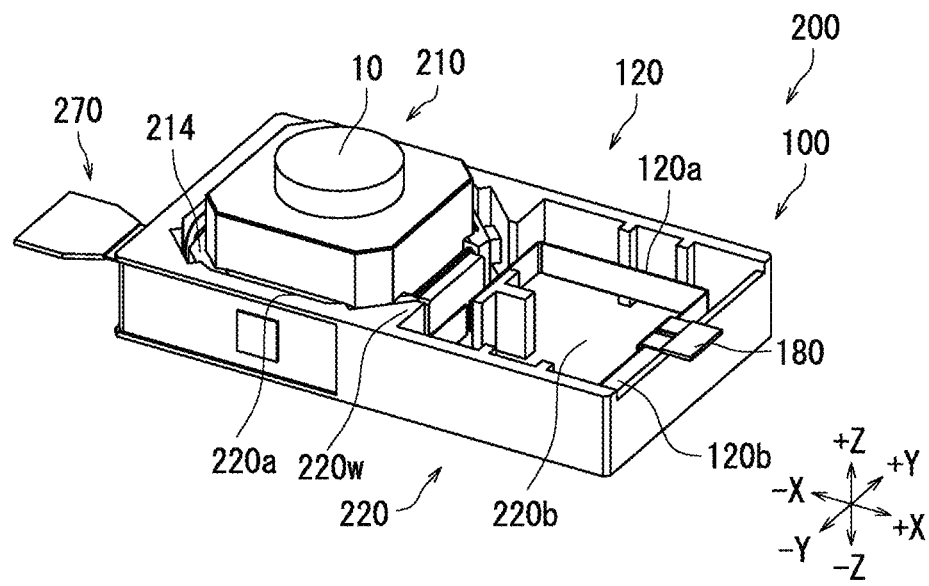
FIG. 14B is a schematic perspective view of the optical assembly of the present example embodiment.

Next, the optical assembly 200 according to the present example embodiment will be described with reference to FIGS. 14A and 14B. FIGS. 14A and 14B are schematic perspective views of the optical assembly 200 of the present example embodiment. Note that, in FIG. 14B, the housing case 290 that covers the fixed body 220 is omitted from illustration for the purpose of preventing the diagram from being excessively complicated. The optical assembly 200 illustrated in FIGS. 14A and 14B has the same configuration as the optical assembly 200 illustrated in FIGS. 9A and 9B except that the circuit board 100 does not include the first reference portion 121, the first coupled portion 122, the first direction first bent portion 123, the second reference portion 131, the second coupled portion 132, and the first direction second bent portion 133, and redundant description is omitted in order to avoid redundancy.

As illustrated in FIGS. 14A and 14B, the optical assembly 200 includes the movable body 210, the fixed body 220, and the circuit board 270. Note that, although not illustrated in FIGS. 14A and 14B, the optical assembly 200 in FIGS. 14A and 14B includes the support mechanism 230 and the swing mechanism 240 similarly to the optical assembly 200 illustrated in FIG. 3. Here, the fixed body 220 has a shape extending in the X-axis direction. The housing case 290 is located on the +Z direction side with respect to the fixed body 220. The housing case 290 covers an opening portion of the fixed body 220.

The movable body 210 is arranged so as to be movable with respect to the fixed body 220. The movable body 210 includes an optical element 10 having at least an imaging element and a holder 214. The optical element 10 includes a circuit board 100. The circuit board 100 extends in the X direction. The circuit board 100 extends in the +X direction with respect to the fixed body 220 and the housing case 290.

The circuit board 270 extends in the X direction. The circuit board 270 extends in the −X direction with respect to the fixed body 220 and the housing case 290. The coils 242*b*, 244*b*, and 246*b* (FIG. 3) are attached to the circuit board 270.

The fixed body 220 accommodates the circuit board 100 together with the movable body 210. The fixed body 220 includes a first housing portion 220*a*, a second housing portion 220*b*, and a separation wall 220*w*. The first housing portion 220*a* accommodates the optical element 10 and the first circuit board (flat portion) 110 (FIG. 3). The second housing portion 220*b* is adjacent to the first housing portion 220*a*. The second housing portion 220*b* accommodates at least a part of the second circuit board 120. The separation wall 220*w* separates the first housing portion 220*a* and the second housing portion 220*b*.

As described above, the fixed body 220 includes the first housing portion 220*a* that accommodates the optical element 10 and the first circuit board 110, the second housing portion 220*b* that is adjacent to the first housing portion 220*a* and accommodates the second circuit board 120, and the separation wall 220*w* that separates the first housing portion 220*a* and the second housing portion 220*b*. In this manner, a signal acquired by the imaging element of the optical element 10 can be easily output to the outside. Further, the first circuit board 110 and the second circuit board 120 can be positioned at predetermined positions by the first housing portion 220*a* and the second housing portion 220*b*, respectively.

The external terminal connection portion 180 is located on the second side (+X direction) in the third direction with respect to the second housing portion 220*b*. A signal acquired by the imaging element can be easily output to the outside by the external terminal connection portion 180.

Figure 15:
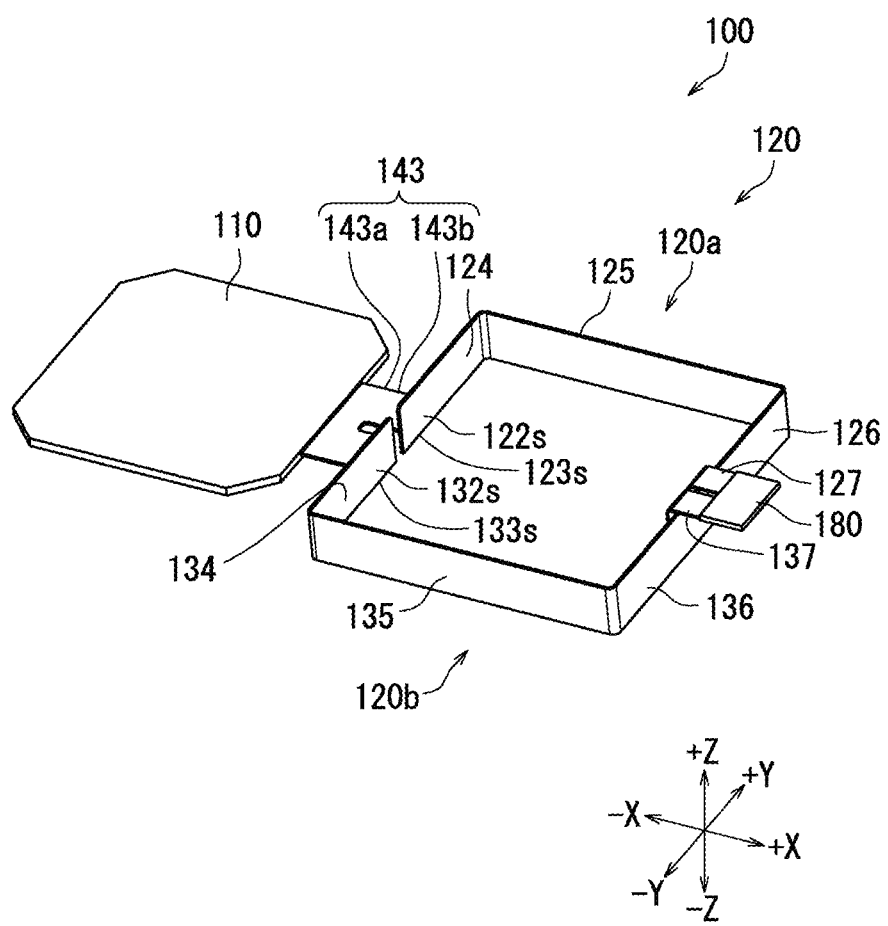
FIG. 15 is a schematic perspective view of the circuit board according to the present example embodiment.

Next, the circuit board 100 of the present example embodiment will be described with reference to FIG. 15. FIG. 15 is a schematic perspective view of the circuit board 100 of the present example embodiment. The circuit board 100 illustrated in FIG. 15 has the same configuration as the circuit board 100 illustrated in FIG. 10 except that the flat portion 110 is illustrated and the circuit board 100 does not include the first reference portion 121, the first coupled portion 122, the first direction first bent portion 123, the second reference portion 131, the second coupled portion 132, and the first direction second bent portion 133, and redundant description is omitted in order to avoid redundancy. Note that, unlike FIG. 10, FIG. 15 also illustrates the first circuit board (flat portion) 110 together with the second circuit board (peripheral portion) 120 of the circuit board 100.

As illustrated in FIG. 15, the circuit board 100 includes the first circuit board (flat portion) 110 and the second circuit board (peripheral portion) 120. Here, the second circuit board 120 is located on the +X direction side with respect to the first circuit board 110.

The second circuit board 120 further includes a connection portion 143 in addition to the first wiring board 120a and the second wiring board 120b. The connection portion 143 connects the first circuit board 110 to each of the first wiring board 120a and the second wiring board 120b.

Here, the first wiring board 120a includes a coupled portion 122s and a bent portion 123s in addition to the second direction extending first portion 124, the third direction extending first portion 125, and the second direction extending third portion 126. The coupled portion 122s connects the second direction extending first portion 124 and the bent portion 123s. In the bent portion 123s, the coupled portion 122s is bent in the +Z direction with respect to the connection portion 143.

Similarly, the second wiring board 120b includes a coupled portion 132s and a bent portion 133s in addition to the second direction extending second portion 134, the third direction extending second portion 135, and the second direction extending fourth portion 136. The coupled portion 132s connects the second direction extending second portion 134 and the bent portion 133s. In the bent portion 133s, the coupled portion 132s is bent in the +Z direction with respect to the connection portion 143.

As described above, the second circuit board 120 further includes the connection portion 143 connected to each of the first circuit board 110, the first wiring board 120a, and the second wiring board 120b. The connection portion 143 electrically connects the bent portion 123s and the bent portion 133s to the first circuit board 110. The connection portion 143 can reduce elastic resistance of the second circuit board 120. Further, since the first wiring board 120a and the second wiring board 120b can be symmetrically connected by the connection portion 143, elastic resistance during rotation in different directions around a rolling axis can be made uniform.

Here, the connection portion 143 includes a first extended portion 143a and a second extended portion 143b. The first extended portion 143a connects the flat portion 110 and the second extended portion 143b. The first extended portion 143a extends in the X direction.

The second extended portion 143b connects the first extended portion 143a and the bent portion 123s or the bent portion 133s. The second extended portion 143b extends in the X direction. The second extended portion 143b branches into two. One is connected to the bent portion 123s, and the other is connected to the bent portion 133s.

A normal direction of a main surface of the second circuit board 120 is parallel to the X direction or the Y direction. For example, a normal direction of each of the second direction extending first portion 124, the second direction extending third portion 126, the second direction extending second portion 134, and the second direction extending fourth portion 136 of the second circuit board 120 is parallel to the X direction. Further, a normal direction of the third direction extending first portion 125 and the third direction extending second portion 135 of the second circuit board 120 is parallel to the Y direction. In contrast, a normal direction of a main surface of the first circuit board 110 is parallel to the Z direction. As described above, the normal direction of the main surface of the second circuit board 120 is orthogonal to the normal direction of the main surface of the first circuit board 110. In this manner, it is possible to reduce elastic resistance of the second circuit board 120 when the optical element 10 illustrated in FIGS. 14A and 14B rotates about a rolling axis. Further, since the normal directions of the main surfaces of the first circuit board 110 and the second circuit board 120 are orthogonal to each other, the second circuit board 120 can be accommodated in a tight space.

The optical assembly 200 further includes the external terminal connection portion 180 electrically connected to the second direction extending third portion 126 and the second direction extending fourth portion 136. A signal acquired by the imaging element of the optical element 10 can be easily output to the outside by the external terminal connection portion 180.

As described with reference to FIGS. 14 and 15, the optical assembly 200 of the present example embodiment includes the optical element 10 having the imaging element, the first circuit board 110 electrically connected to the imaging element, the fixed body 220 swingably supporting the optical element 10 and the first circuit board 110, and the second circuit board 120 electrically connected to the first circuit board 110. The optical element 10 has the optical axis Pa extending in the first direction.

The second circuit board 120 includes the first wiring board 120a and the second wiring board 120b. The first wiring board 120a has the second direction extending first portion 124 extending to the first side (−Y direction) of the second direction orthogonal to the first direction (Z direction) and the third direction extending first portion 125 extending to the first side (−X direction) of the third direction orthogonal to the first direction (Z direction) and the second direction (Y direction) from the second direction extending first portion 124.

The second wiring board 120b has the second direction extending second portion 134 extending to the first side (−Y direction) of the second direction and the third direction extending second portion 135 extending to the first side (−X direction) of the third direction from the second direction extending second portion 134. Since the second circuit board 120 can be made relatively long, elastic resistance of the second circuit board 120 when the optical element 10 rotates about the rolling axis can be reduced.

In addition to the second direction extending first portion 124 and the third direction extending first portion 125, the first wiring board 120a further includes the second direction extending third portion 126 extending to the first side (−Y direction) of the second direction from the third direction extending first portion 125.

Similarly, in addition to the second direction extending second portion 134 and the third direction extending second portion 135, the second wiring board 120b further includes the second direction extending fourth portion 136 extending to the first side (−Y direction) of the second direction from the third direction extending second portion 135. The second direction extending fourth portion 136 is arranged linearly with the second direction extending third portion 126. Therefore, the second direction extending first portion 124 and the second direction extending third portion 126 of the first wiring board 120a and the second direction extending second portion 134 and the second direction extending fourth portion 136 of the second wiring board 120b are arranged in parallel to each other, and the third direction extending first portion 125 of the first wiring board 120a and the third direction extending second portion 135 of the second wiring board 120b are arranged in parallel to each other. For this reason, elastic resistance of the second circuit board 120 can be reduced.

Note that, as described above with reference to FIGS. 9A to 10 and 14A to 15, the first wiring portion 120a and the second wiring portion 120b may surround a region adjacent to the flat portion 110 without surrounding the flat portion 110. Note that, in the circuit board 100 illustrated in FIGS. 9A to 10 and FIGS. 14A to 15, the first wiring portion 120a has the third direction extending third portion 127 bent in the +X direction from the second direction extending third portion 126, and the second wiring portion 120b has the third direction extending fourth portion 137 bent in the +X direction from the second direction extending fourth portion 136. However, the present example embodiment is not limited to this configuration. The first wiring portion 120a may be bent in the −X direction from the second direction extending third portion 126, and the second wiring portion 120b may be bent in the −X direction from the second direction extending fourth portion 136.

Figure 16A:
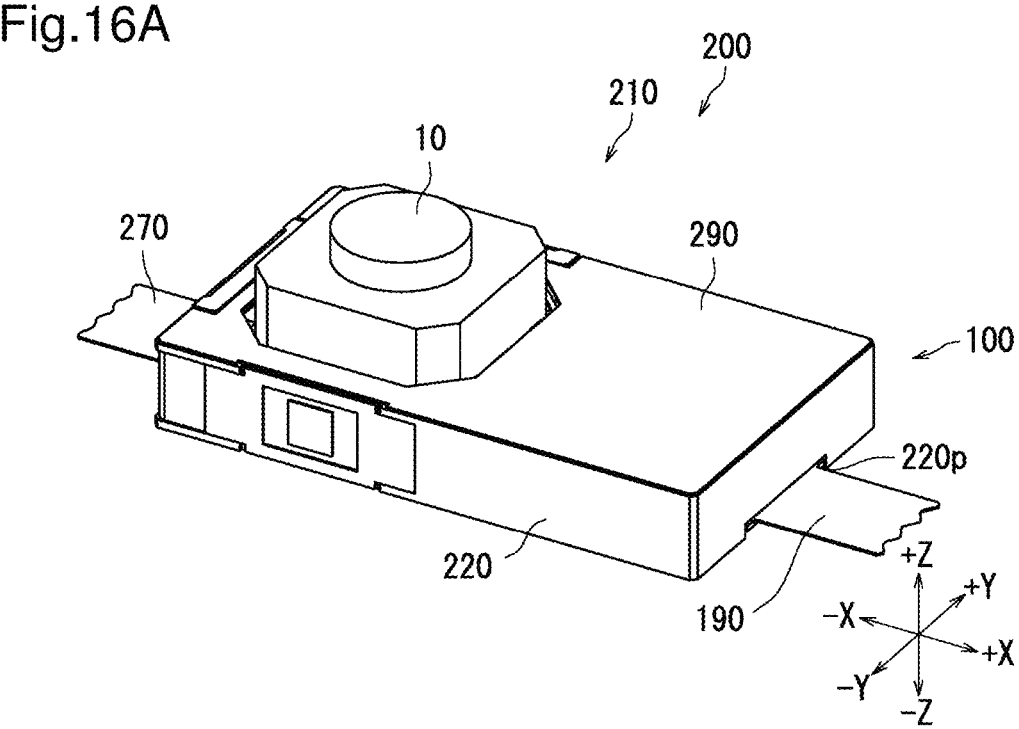
FIG. 16A is a schematic perspective view of the optical assembly of the present example embodiment.
Figure 16B:
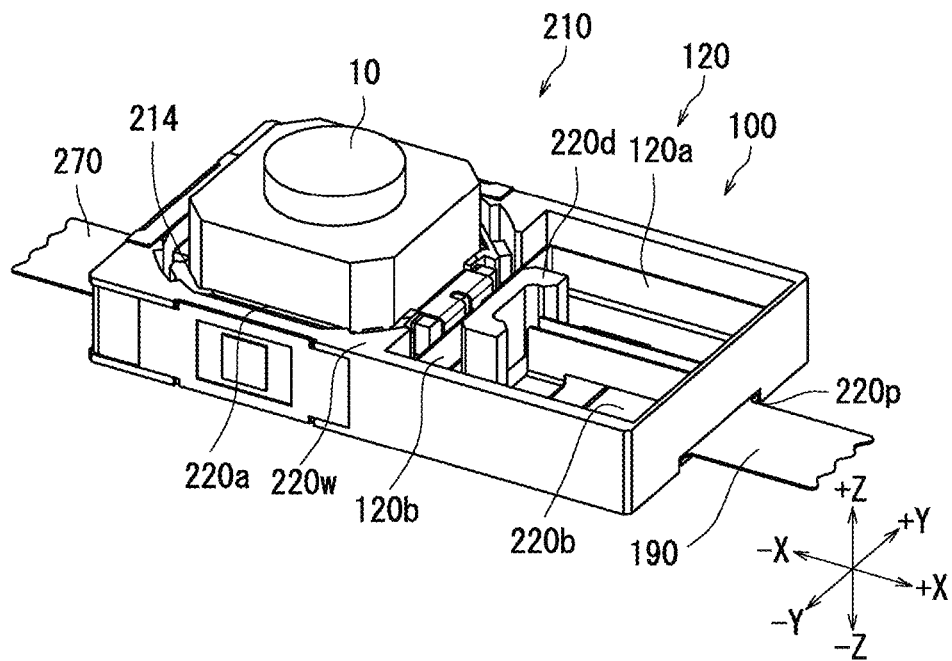
FIG. 16B is a schematic perspective view of the optical assembly of the present example embodiment.

Next, the optical assembly 200 according to the present example embodiment will be described with reference to FIGS. 16A and 16B. FIGS. 16A and 16B are schematic perspective views of the optical assembly 200 of the present example embodiment. Note that, in FIG. 16B, the housing case 290 that covers the fixed body 220 is omitted from illustration for the purpose of preventing the diagram from being excessively complicated. The optical assembly 200 illustrated in FIGS. 16A and 16B has the same configuration as the optical assembly 200 illustrated in FIGS. 9A and 9B except that the circuit board 100 further includes a portion folded back to a region surrounded by the second direction extending first portion 124, the third direction extending first portion 125, the second direction extending third portion 126, the second direction extending fourth portion 136, the third direction extending second portion 135, and the second direction extending second portion 134, and redundant description is omitted for the purpose of avoiding redundancy.

As illustrated in FIGS. 16A and 16B, the optical assembly 200 includes the movable body 210, the fixed body 220, and the circuit board 270. Note that, although not illustrated in FIGS. 16A and 16B, the optical assembly 200 in FIGS. 16A and 16B includes the support mechanism 230 and the swing mechanism 240 similarly to the optical assembly 200 illustrated in FIG. 3. Here, the fixed body 220 has a shape extending in the X-axis direction. The housing case 290 is located on the +Z direction side with respect to the fixed body 220. The housing case 290 covers an opening portion of the fixed body 220.

The movable body 210 is arranged so as to be movable with respect to the fixed body 220. The movable body 210 includes an optical element 10 having at least an imaging element and a holder 214. The optical element 10 includes the circuit board 100. The circuit board 100 extends in the X direction. The circuit board 100 extends in the +X direction with respect to the fixed body 220 and the housing case 290.

The circuit board 100 includes a third circuit board 190 in addition to the first circuit board (flat portion) 110 (FIG. 3) and the second circuit board 120. The second circuit board 120 is electrically connected to the first circuit board 110 and the third circuit board 190. The second circuit board 120 is located on the +X direction side with respect to the first circuit board 110. The third circuit board 190 is located on the −Z direction side with respect to the second circuit board 120.

The fixed body 220 accommodates the circuit board 100 together with the movable body 210. The fixed body 220 includes a first housing portion 220a, a second housing portion 220b, and a separation wall 220w. The first housing portion 220a accommodates the optical element 10 and the first circuit board (flat portion) 110 (FIG. 3). The second housing portion 220b is adjacent to the first housing portion 220a. The second housing portion 220b accommodates at least a part of each of the second circuit board 120 and the third circuit board 190. The separation wall 220w separates the first housing portion 220a and the second housing portion 220b.

The fixed body 220 is provided with an extraction hole 220p through which the third circuit board 190 passes. The third circuit board 190 passes from the second housing portion 220b of the fixed body 220 to the outside of the fixed body 220 through the extraction hole 220p. The extraction hole 220p is provided in a bottom surface or a side surface of the second housing portion 220b.

As described above, the extraction hole 220p through which the third circuit board 190 passes is provided on the bottom surface or the side surface of the second housing portion 220b. The extraction hole 220p allows the third circuit board 190 to be taken out from the inside or the side surface of the second housing portion 220b to the outside.

Figure 17:
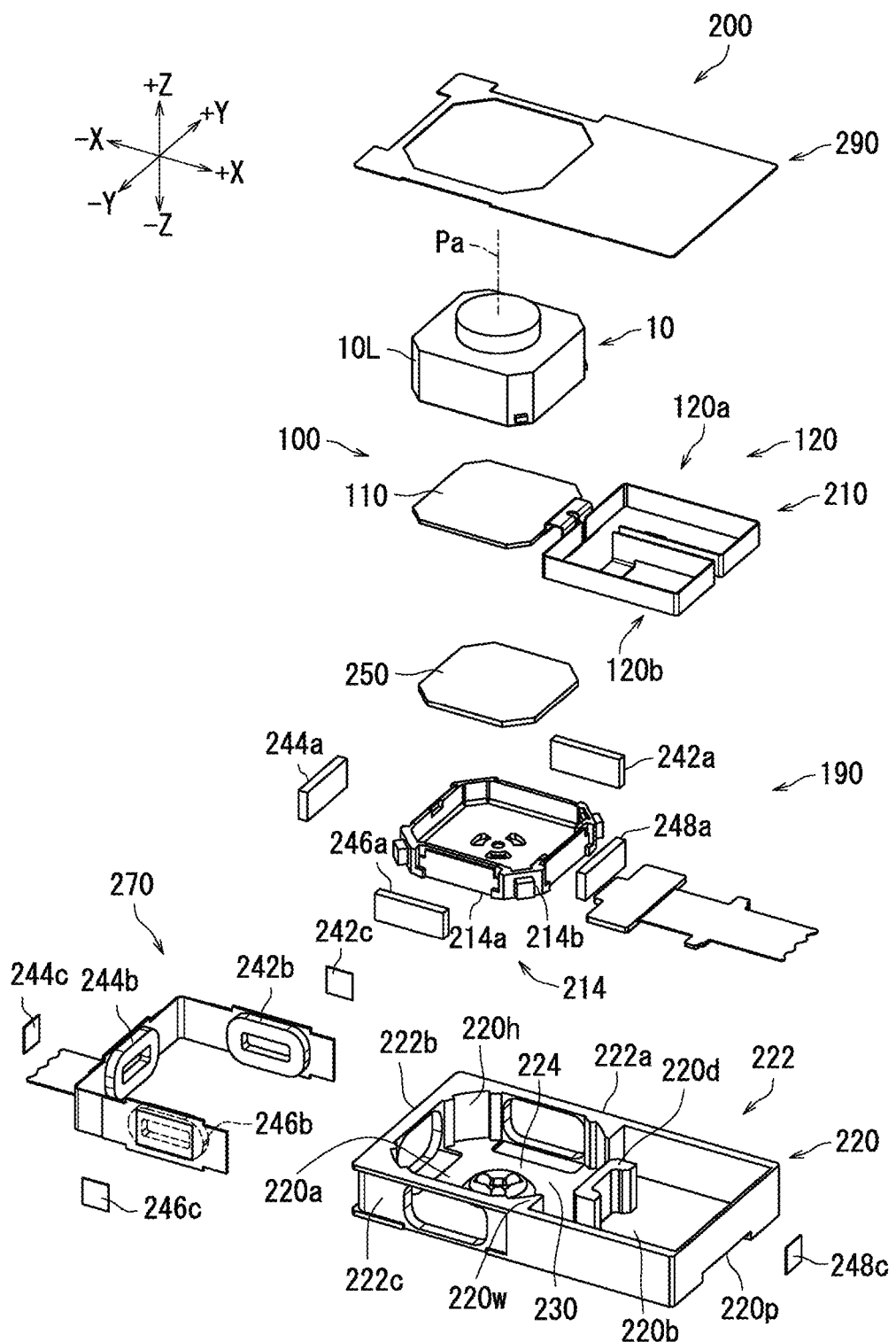
FIG. 17 is a schematic exploded perspective view of the optical assembly of the present example embodiment.

Next, the optical assembly 200 according to the present example embodiment will be described with reference to FIGS. 16 to 17. FIG. 17 is a schematic exploded perspective view of the optical assembly 200 of the present example embodiment. The optical assembly 200 illustrated in FIG. 17 has the same configuration as that described above with reference to FIG. 3 except that the shapes of the circuit board 100 and the fixed body 220 are different and an elastic member 250 is further provided, and redundant description is omitted for the purpose of avoiding redundancy.

As illustrated in FIG. 17, the optical assembly 200 includes the movable body 210, the fixed body 220, the support mechanism 230, the swing mechanism 240, the circuit board 270, and the housing case 290. The movable body 210 includes the optical element 10 and the holder 214.

The circuit board 100 includes the first circuit board (flat portion) 110 and the second circuit board (peripheral portion 120). The peripheral portion 120 includes a first wiring portion 120a and a second wiring portion 120b. The first wiring portion 120a is located on the +Y direction side with respect to the flat portion 110. The second wiring portion 120b is located on the −Y direction side with respect to the flat portion 110.

The circuit board 100 further includes the third circuit board 190 in addition to the first circuit board 110 and the second circuit board 120. The second circuit board 120 is electrically connected to the first circuit board 110 and the third circuit board 190. The second circuit board 120 is located on the +X direction side with respect to the first circuit board 110. Further, the second circuit board 120 is located on the +Z direction side with respect to the third circuit board 190.

The optical assembly 200 further includes the third circuit board 190 electrically connected to the second circuit board 120 in the second housing portion 220b. With the third circuit board 190, lengths of the second circuit board 120 and the third circuit board 130 connected to the first circuit board 110 can be increased, so that elastic resistance of the second circuit board 120 can be reduced.

The optical assembly 200 may further include the elastic member 250. The elastic member 250 is made from a material having a higher elastic modulus than the lens unit 10L. The elastic member 250 is located between the first circuit board 110 and the holder 214. The elastic member 250 can suppress transmission of an impact on the holder 214 to the first circuit board 110.

The second housing portion 220b of the fixed body 220 is provided with a projection portion 220d. The projection portion 220d protrudes in the +Z direction in the second housing portion 220b. Here, a side surface on the +X direction side of the projection portion 220d is recessed in the −X direction. The third circuit board 190 protrudes according to the recess of the projection portion 220d, and the third circuit board 190 is fitted into the recess of the projection portion 220d.

Figure 18:
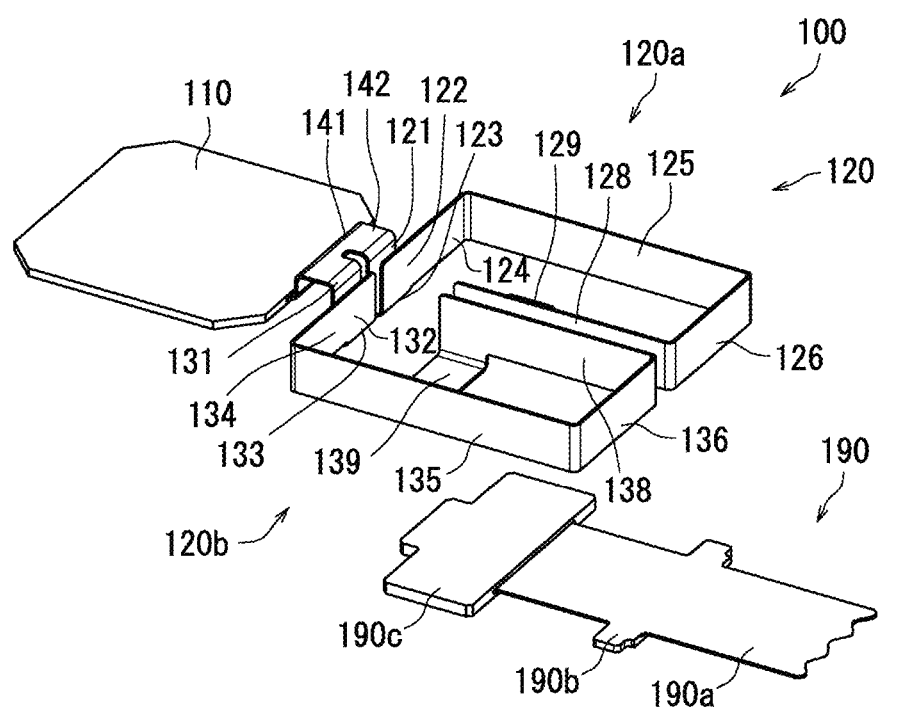
FIG. 18 is a schematic perspective view of the circuit board according to the present example embodiment.

Next, the circuit board 100 of the present example embodiment will be described with reference to FIG. 18. FIG. 18 is a schematic exploded perspective view of the circuit board 100 of the present example embodiment.

As illustrated in FIG. 18, the circuit board 100 includes the first circuit board 110, the second circuit board 120, and the third circuit board 130. The second circuit board 120 further includes a portion folded back to a region surrounded by the second direction extending first portion 124, the third direction extending first portion 125, the second direction extending third portion 126, the second direction extending fourth portion 136, the third direction extending second portion 135, and the second direction extending second portion 134.

The first wiring portion 120a further includes a third direction extending fifth portion 128 in addition to the first reference portion 121, the first coupled portion 122, the first direction first bent portion 123, the second direction extending first portion 124, the third direction extending first portion 125, and the second direction extending third portion 126. The first reference portion 121, the first coupled portion 122, the first direction first bent portion 123, and the second direction extending first portion 124 are located on the +X direction side with respect to the flat portion 110. For example, the first wiring portion 120a includes one linear circuit board.

The third direction extending fifth portion 128 is bent in the −X direction with respect to the second direction extending third portion 126. A length of the third direction extending fifth portion 128 along the X direction is shorter than a length of the third direction extending first portion 125 along the X direction.

Similarly, the second wiring portion 120b includes one linear circuit board. The second wiring portion 120b includes a third direction extending sixth portion 138 in addition to the second reference portion 131, the second coupled portion 132, the first direction second bent portion 133, the second direction extending second portion 134, the third direction extending second portion 135, and the second direction extending fourth portion 136. The second reference portion 131, the second coupled portion 132, the first direction second bent portion 133, and the second direction extending second portion 134 are located on the +X direction side with respect to the flat portion 110.

The third direction extending sixth portion 138 is bent in the −X direction with respect to the second direction extending fourth portion 136. A length of the third direction extending sixth portion 138 along the X direction is shorter than a length of the third direction extending second portion 135 along the X direction.

The third direction extending sixth portion 138 extends in parallel with the third direction extending fifth portion 128. A length of the third direction extending sixth portion 138 along the X direction is substantially equal to a length of the third direction extending fifth portion 128 along the X direction.

As described above, the first wiring board 120a further includes the third direction extending fifth portion 128 extending from the second direction extending third portion 126 to the second side (+X direction) in the third direction. The second wiring board 120b further includes the third direction extending sixth portion 138 extending from the second direction extending fourth portion 136 to the second side (+X direction) of the third direction. Since the third direction extending fifth portion 128 and the third direction extending sixth portion 138 make the second circuit board 120 relatively long, elastic resistance of the second circuit board 120 can be reduced.

The third circuit board 190 has a substantially thin plate shape extending in the X direction. A normal direction of a main surface of the third circuit board 190 extends parallel to a normal direction (Z direction) of a main surface of the first circuit board 110. In this manner, a space in the second housing portion 220b can be effectively utilized without the third circuit board 190 colliding with the second circuit board 120.

The third circuit board 190 includes a main body portion 190a, a wide portion 190b, and a connection portion 190c. The main body portion 190a has a thin plate shape extending in the X direction. The wide portion 190b partially extends in the Y direction from a side surface of the main body portion 190a.

The connection portion 190c connects the main body portion 190a and the second circuit board 120. The connection portion 190c fixes the second circuit board 120 and electrically connects the main body portion 190a and the second circuit board 120. The connection portion 190c is located in an end portion on the −X direction side of the main body portion 190a and covers the end portion on the −X direction side of the main body portion 190a. A length of the connection portion 190c along the Y direction is larger than a length of the main body portion 190a along the Y direction.

The first wiring board 120a further includes a second direction extending fifth portion 129. A normal direction of the second direction extending fifth portion 129 is parallel to the Z direction. The second direction extending fifth portion 129 is connected to the third circuit board 190. The second direction extending fifth portion 129 extends from the third direction extending fifth portion 128 to the first side (−Y direction) of the second direction. Specifically, the second direction extending fifth portion 129 is fixed to the connection portion 190c of the third circuit board 190.

Similarly, the second wiring board 120b further includes a second direction extending sixth portion 139. A normal direction of the second direction extending sixth portion 139 is parallel to the Z direction. The second direction extending sixth portion 139 is connected to the third circuit board 190. The second direction extending sixth portion 139 extends from the third direction extending sixth portion 138 to the first side (+Y direction) of the second direction. Further, the second direction extending sixth portion 139 is fixed to the connection portion 190c of the third circuit board 190. The second direction extending fifth portion 129 and the second direction extending sixth portion 139 can be fixed to the connection portion 190c in a state of extending in opposite directions to each other, and the third direction extending fifth portion 128 and the third direction extending sixth portion 138 can be brought close to each other. In this manner, the entire lengths of the first wiring board 120a and the second wiring board 120b can be increased, and elastic resistance of the second circuit board 120 can be reduced.

Figure 19:
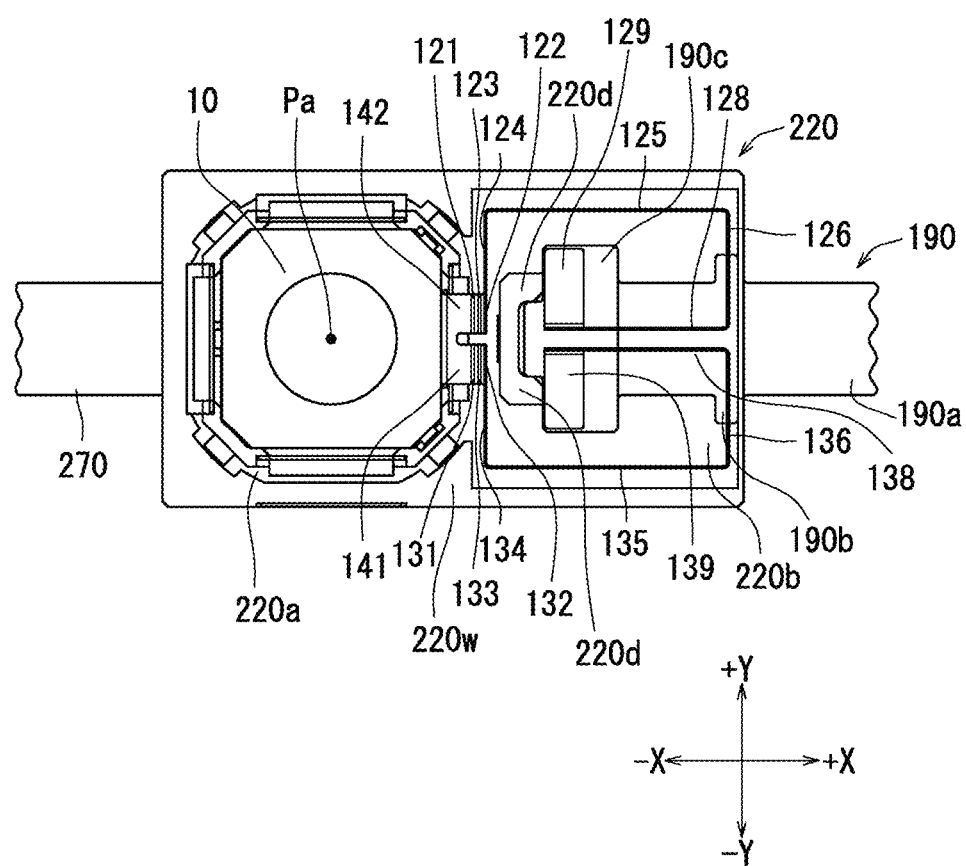
FIG. 19 is a schematic top view of the optical assembly of the present example embodiment.

Next, the optical assembly 200 according to the present example embodiment will be described with reference to FIG. 19. FIG. 19 is a schematic top view of the optical assembly 200 of the present example embodiment. In FIG. 19, the housing case 290 is omitted.

As illustrated in FIG. 19, the fixed body 220 accommodates the circuit board 100 together with the movable body 210. The fixed body 220 includes a first housing portion 220a, a second housing portion 220b, and a separation wall 220w. The first housing portion 220a accommodates the optical element 10 and the first circuit board 110 located on the −Z direction side with respect to the optical element 10. The second housing portion 220b is adjacent to the first housing portion 220a. The second housing portion 220b accommodates at least a part of each of the second circuit board 120 and the third circuit board 190.

In a case where the third circuit board 190 is accommodated in the second housing portion 220b of the fixed body 220, the wide portion 190b is adjacent to an inner peripheral surface of the second housing portion 220b on the +X direction side.

The second housing portion 220b has the projection portion 220d in contact with the second circuit board 120 in the second direction (Y direction) and the third direction (X direction). Here, the projection portion 220d is provided with a cavity corresponding to a protruding portion of the connection portion 190c of the third circuit board 190. By fitting the connection portion 190c of the third circuit board 190 that fixes the second circuit board 120 into the cavity of the projection portion 220d, the second circuit board 120 can be positioned in the second housing portion 220b.

Note that, in the optical assembly 200 and each member of the optical assembly 200 illustrated in FIGS. 2 to 19, the movable body 210 has a substantially thin plate shape. However, the present example embodiment is not limited to this configuration. The movable body 210 may have a substantially spherical shape, and the fixed body 220 may swingably support the movable body 210 according to the shape of the movable body 210.

The smartphone 300 includes the optical assembly 200 of the present example embodiment. The elastic resistance of the circuit board 100 in the smartphone 300 can be reduced.

The smartphone 300 includes the optical assembly 200 including the shake correction assembly 200A and the optical element 10 described above. With the above configuration, a shake of the optical element 10 in the smartphone 300 can be corrected.

Note that while FIG. 1 illustrates the smartphone 300 as an example of the application of the optical assembly 200 of the present example embodiment, the application of the optical assembly 200 is not limited to this. The optical assembly 200 is preferably used for a digital camera or a video camera. For example, the optical assembly 200 may be used as a part of a dashboard camera. Alternatively, the optical assembly 200 may be mounted on a camera for a flying object (for example, a drone).

The example embodiment of the present disclosure is described above with reference to the drawings. However, the present disclosure is not limited to the above example embodiment, and can be implemented in various modes without departing from the gist of the disclosure. Further, various disclosures are possible by appropriately combining a plurality of constituents disclosed in the above example embodiment. For example, some constituents may be removed from all the constituents described in the example embodiment. Furthermore, constituents across different example embodiments may be combined as appropriate. The constituents in the drawings are mainly and schematically illustrated to facilitate better understanding, and the thickness, length, number, spacing, and the like of each constituent illustrated in the drawings may differ from actual values for the convenience of creating drawings. Additionally, the material, shape, dimension, and the like of each constituent element illustrated in the above example embodiments are mere examples and are not particularly limited, and various modifications can be made without substantially departing from the effects of the present disclosure.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A circuit board mounted on a camera module with a shake correction function, the circuit board comprising:
    a first reference portion extending from a first side in a first direction to a second side in the first direction;
    a first coupled portion extending from the second side in the first direction to the first side in the first direction;
    a first direction first bent portion connected to each of an end portion on the second side in the first direction of the first reference portion and an end portion on the second side in the first direction of the first coupled portion; and
    a second direction extending first portion extending in a second direction orthogonal to the first direction from the first coupled portion; wherein
    the first direction extends in parallel with an optical axis of the camera module.

2. The circuit board according to claim 1, wherein the first direction first bent portion includes a curved structure.

3. The circuit board according to claim 1, further comprising:
    a third direction extending first portion extending in a third direction orthogonal to the first direction and the second direction from the second direction extending first portion; and
    a second direction extending third portion extending in the second direction from the third direction extending first portion.

4. The circuit board according to claim 1, further comprising:
    a second coupled portion extending from the second side in the first direction to the first side in the first direction separately from the first coupled portion; and
    a second direction extending second portion extending in the second direction from the second coupled portion; wherein
    the second direction extending first portion extends from the first coupled portion to a first side in the second direction; and
    the second direction extending second portion extends from the second coupled portion to a second side in the second direction.

5. The circuit board according to claim 3, further comprising:

a second coupled portion extending from the second side in the first direction to the first side in the first direction separately from the first coupled portion;

a second direction extending second portion extending in the second direction from the second coupled portion;

a third direction extending second portion extending in the third direction from the second direction extending second portion; and a second direction extending fourth portion extending in the second direction from the third direction extending second portion; wherein the second direction extending first portion extends from the first coupled portion to the first side in the second direction; and the second direction extending second portion extends from the second coupled portion to the second side in the second direction.

6. The circuit board according to claim 5, further comprising an axisymmetric structure with respect to an axis extending in the third direction.

7. The circuit board according to claim 5, further comprising:
a second reference portion extending in parallel with the first reference portion from the first side in the first direction to the second side in the first direction separately from the first reference portion; and
a first direction second bent portion connected to each of an end portion on the second side in the first direction of the second reference portion and an end portion on the second side in the first direction of the second coupled portion separately from the first direction first bent portion.

8. The circuit board according to claim 7, further comprising:
a flat portion; and
an extended portion connecting the first reference portion and the second reference portion to the flat portion.

9. The circuit board according to claim 8, further comprising an external terminal connection portion extending in the third direction from the second direction extending third portion and the second direction extending fourth portion.

10. The circuit board according to claim 9, wherein
the extended portion is located on a first side in the third direction with respect to the second direction extending first portion and the second direction extending second portion; and
the external terminal connection portion is located on the first side in the third direction with respect to the second direction extending third portion and the second direction extending fourth portion.

11. The circuit board according to claim 9, wherein
the extended portion is located on the first side in the third direction with respect to the second direction extending first portion and the second direction extending second portion; and
the external terminal connection portion is located on a second side in the third direction with respect to the second direction extending third portion and the second direction extending fourth portion.

12. The circuit board according to claim 9, wherein
a thickness direction of the second direction extending first portion, the second direction extending second portion, the second direction extending third portion, and the second direction extending fourth portion is parallel to the third direction; and
a thickness direction of the third direction extending first portion and the third direction extending second portion is parallel to the second direction.

13. A shake correction assembly that corrects a shake of an optical module including at least an imaging element, the shake correction assembly comprising:
a movable body;
a fixed body that movably supports the movable body; and
the circuit board according to claim 3 connected to the movable body.

14. The shake correction assembly according to claim 13, wherein the circuit board is located radially outside the fixed body and separate from the fixed body.

15. The shake correction assembly according to claim 13, wherein
the fixed body includes a bottom portion and a side portion; and
a portion of the side portion of the fixed body corresponding to the first coupled portion is open.

16. The shake correction assembly according to claim 13, further comprising a housing case that accommodates the circuit board.

17. The shake correction assembly according to claim 13, further comprising a swing mechanism capable of swinging the movable body with respect to the fixed body.

18. The shake correction assembly according to claim 17, wherein
the swing mechanism includes:
a first swing mechanism that swings the movable body with respect to the fixed body with the third direction orthogonal to the first direction and the second direction as an axial center; and
a second swing mechanism that swings the movable body with respect to the fixed body with the second direction as an axial center.

19. The shake correction assembly according to claim 18, wherein the swing mechanism further includes a third swing mechanism that swings the movable body with respect to the fixed body with the first direction as an axial center.

20. A smartphone comprising:
an optical assembly including the shake correction assembly according to claim 13; and
the optical module.

* * * * *